(12) United States Patent
Neto

(10) Patent No.: US 11,847,644 B2
(45) Date of Patent: Dec. 19, 2023

(54) SYSTEM AND METHOD FOR GROUP TRANSACTIONS

(71) Applicant: Jeffrey Neto, Cumberland, RI (US)

(72) Inventor: Jeffrey Neto, Cumberland, RI (US)

(73) Assignee: VERRO, LLC, Cumberland, RI (US)

( * ) Notice: Subject to any disclaimer, the term of this patent is extended or adjusted under 35 U.S.C. 154(b) by 0 days.

(21) Appl. No.: 17/318,540

(22) Filed: May 12, 2021

(65) Prior Publication Data

US 2021/0357920 A1     Nov. 18, 2021

Related U.S. Application Data

(60) Provisional application No. 63/024,583, filed on May 14, 2020.

(51) Int. Cl.
| | |
|---|---|
| *G06Q 20/38* | (2012.01) |
| *G06Q 20/32* | (2012.01) |
| *G06Q 20/20* | (2012.01) |
| *G06Q 20/22* | (2012.01) |
| *G06Q 40/02* | (2023.01) |
| *G06Q 50/00* | (2012.01) |
| *G06Q 20/02* | (2012.01) |

(52) U.S. Cl.
CPC ......... *G06Q 20/384* (2020.05); *G06Q 20/023* (2013.01); *G06Q 20/204* (2013.01); *G06Q 20/22* (2013.01); *G06Q 20/326* (2020.05); *G06Q 20/3278* (2013.01); *G06Q 40/02* (2013.01); *G06Q 50/01* (2013.01)

(58) Field of Classification Search
CPC .. G06Q 20/384; G06Q 20/023; G06Q 20/204; G06Q 20/22; G06Q 20/326; G06Q 20/3278; G06Q 40/02; G06Q 50/01; G06Q 20/223; G06Q 20/401; G06Q 20/229

See application file for complete search history.

(56) References Cited

U.S. PATENT DOCUMENTS

| | | | | |
|---|---|---|---|---|
| 7,343,335 | B1 * | 3/2008 | Olliphant ............... | G06Q 20/10 705/40 |
| 8,401,968 | B1 * | 3/2013 | Schattauer ............. | G06Q 30/06 705/37 |
| 9,934,505 | B2 * | 4/2018 | Atagun ................. | G06Q 20/322 |
| 9,990,620 | B2 * | 6/2018 | Sivaraman ......... | G06Q 20/3223 |
| 2005/0027626 | A1 * | 2/2005 | Garcia .................. | G06Q 40/00 705/35 |

(Continued)

OTHER PUBLICATIONS

Guo, Ruifeng. "Designing an Android Application for Bills Segregation." arXiv preprint arXiv:2104.06823 (2021). (Year: 2014).*

(Continued)

*Primary Examiner* — Asfand M Sheikh

(74) *Attorney, Agent, or Firm* — TUCKER ELLIS LLP; Evan Perry

(57) ABSTRACT

A group payment system is provided which permits users to form groups and, as a group, to contribute resources to group funds to make group payments, purchases, and transfer of funds to other groups, individual users, or merchants. Group transactions are conducted via a group transaction application downloaded onto user devices. The group transaction application enables the formation of user groups and facilitates payment in group transaction settings.

12 Claims, 28 Drawing Sheets

(56) References Cited

U.S. PATENT DOCUMENTS

| | | | |
|---|---|---|---|
| 2005/0108116 A1* | 5/2005 | Dobson | G06Q 30/04 705/30 |
| 2006/0206416 A1* | 9/2006 | Farias | G06Q 40/00 705/38 |
| 2008/0052203 A1* | 2/2008 | Beyer | G06Q 10/087 705/28 |
| 2008/0222054 A1* | 9/2008 | Blagg | G06Q 20/108 705/500 |
| 2010/0078472 A1* | 4/2010 | Lin | G06Q 20/405 235/379 |
| 2010/0121745 A1* | 5/2010 | Teckchandani | G06Q 40/12 705/40 |
| 2010/0153224 A1* | 6/2010 | Livnat | G06Q 40/12 709/219 |
| 2011/0313897 A1* | 12/2011 | Mulakaluri | G06Q 40/12 705/30 |
| 2012/0166332 A1* | 6/2012 | Naaman | G06Q 30/04 705/40 |
| 2012/0197794 A1* | 8/2012 | Grigg | G06Q 20/40 705/41 |
| 2012/0226614 A1 | 9/2012 | Gura et al. | |
| 2012/0246066 A1* | 9/2012 | Rice | G06Q 20/08 705/39 |
| 2012/0303425 A1* | 11/2012 | Katzin | G06Q 20/4016 705/16 |
| 2013/0080333 A1* | 3/2013 | Kamotskyy | H04L 9/3234 705/41 |
| 2013/0090980 A1* | 4/2013 | Hummel | G06Q 50/01 705/7.29 |
| 2013/0173467 A1* | 7/2013 | Nuzzi | G06Q 20/3224 705/44 |
| 2014/0058862 A1* | 2/2014 | Celkonas | G06Q 20/326 705/18 |
| 2014/0074691 A1* | 3/2014 | Bank | G06Q 20/3278 705/39 |
| 2014/0172704 A1* | 6/2014 | Atagun | G06Q 20/322 705/44 |
| 2016/0042328 A1 | 2/2016 | Teckchandani et al. | |
| 2016/0048823 A1* | 2/2016 | Wetzel | G06Q 20/29 705/39 |
| 2016/0092878 A1* | 3/2016 | Radu | G06Q 20/4012 705/72 |
| 2016/0314451 A1* | 10/2016 | Martin | G06Q 20/227 |
| 2017/0193468 A1* | 7/2017 | Chougule | H04L 65/4076 |
| 2017/0352019 A1 | 12/2017 | Li et al. | |
| 2018/0032996 A1* | 2/2018 | Phillips | G06Q 20/102 |
| 2018/0082283 A1* | 3/2018 | Sharma | G06Q 20/42 |
| 2018/0357628 A1* | 12/2018 | Vergari | G06Q 20/3278 |
| 2019/0080312 A1* | 3/2019 | Yeager | G06Q 20/3674 |
| 2021/0304194 A1* | 9/2021 | Yamada | G06Q 20/227 |

OTHER PUBLICATIONS

International Search Report and Written Opinion of the International Searching Authority; PCT/US2021/031976; dated Aug. 11, 2021; 14 pages.

* cited by examiner

SYSTEM AND METHOD FOR GROUP TRANSACTIONS

RELATED APPLICATIONS

This application relates to U.S. Provisional Patent Application Ser. No. 63/024,583 filed on May 14, 2020 entitled "SYSTEM AND METHOD FOR GROUP TRANSACTIONS", which is incorporated herein by reference in its entirety.

TECHNICAL FIELD

This application relates generally to a group payment mechanism and, more particularly, to systems and methods facilitating the use of groups to create a group fund to make group payments, purchases, and transfer of funds to other groups, individuals, and/or merchants.

BACKGROUND

The current methods available for fund transfers are through a person-to-person (P2P) fund transfer applications/software, such as Venmo or Paypal. These applications typically support only transfers from one individual to one other individual (or merchant). That is, existing solutions enable individual transactions between two parties.

SUMMARY

This summary is provided herein to help enable a basic or general understanding of various aspects of exemplary, non-limiting embodiments that follow in the detailed description and the accompanying drawings. This summary is not intended, however, as an extensive or exhaustive overview. This summary is not intended to identify key factors or essential features of the claimed subject matter, nor is it intended to be used to limit the scope of the claimed subject matter. Instead, the sole purpose of the summary is to present some concepts related to some exemplary non-limiting embodiments in a simplified form as a prelude to the more detailed description of the various embodiments that follow.

In one implementation, a method of performing a group transaction is provided. The method includes forming a group using a group transaction application, wherein the group comprises a plurality of group users; contributing an amount of money to a group fund associated with the group; transmitting a group fund request, via the group transaction application, to each of the plurality of group users, wherein the group fund request seeks authorization from each of the plurality of group users to use the group fund to make a payment; and receiving authorization from each of the plurality of group users to use the group fund to make the payment, wherein the payment is associated with a group transaction.

In another implementation, another method of performing a group transaction is provided. The method includes forming a group using a group transaction application, wherein the group comprises a plurality of group users; receiving transaction data from a merchant, wherein the transaction data identifies items for purchase and a cost of each item; selecting, by a first group user of the plurality of group users, one or more items of the transaction for payment using an account of the first group user; and paying the merchant the cost of the items selected using the account of the first group user.

In another implementation, a non-transitory, computer-readable storage medium is provided. The storage medium stores instructions, that, when executed by at least one processor, perform a method that includes: forming a group, wherein the group comprises a plurality of group users; contributing an amount of money to a group fund associated with the group; transmitting a group fund request to each of the plurality of group users, wherein the group fund request seeks authorization from each of the plurality of group users to use the group fund to make a payment; and receiving authorization from each of the plurality of group users to use the group fund to make the payment, wherein the payment is associated with a group transaction.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described with reference to the accompanying drawings in which:

FIG. 11b is a picture of the exemplary, non-limiting first embodiment of the home screen for the group transaction application of FIG. 11a;

FIG. 12*l* is an exemplary screenshot of a graphical representation of a notification indicating payment successfully processed according to the second embodiment of the group transaction application;

DETAILED DESCRIPTION

Figure 1:
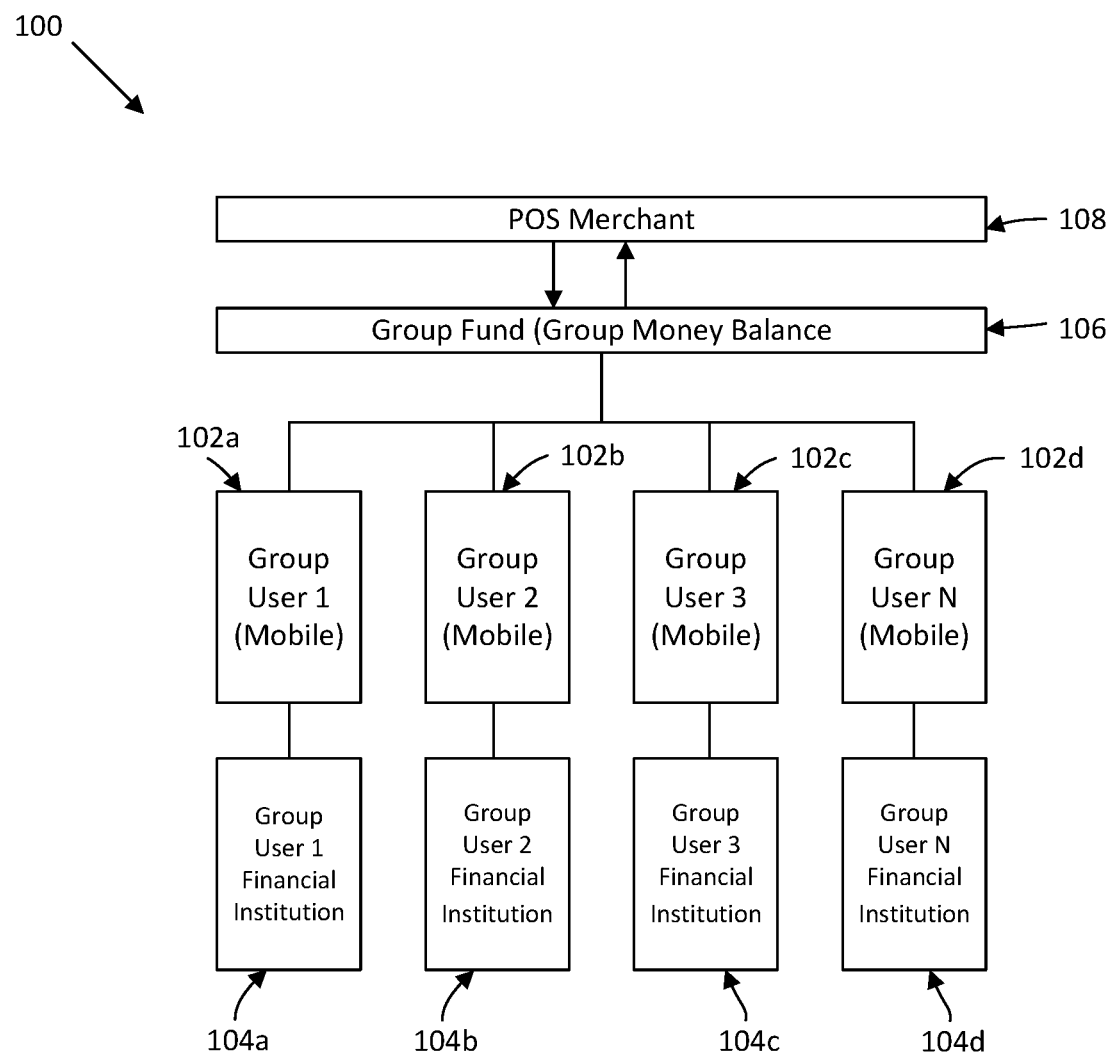
FIG. 1 is a general schematic diagram of an exemplary, non-limiting embodiment of a group transaction according to one or more aspects.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As discussed above, existing payment systems and e-commerce solutions do not provide a satisfactory payment mechanism for transacting in group settings. The group transaction system and method described herein serves as a viable, flexible solution for various types of transactions between multi-user groups, single users, and merchants engaging in activities such as group-to-group (G2G) money transfers and transactions, group-to-person (G2P) money transfers and transactions, and group-to-merchant (G2M) money transfers and transactions.

In various non-limiting embodiments, a system and associated methods are provided which permit users to form groups and, as members of a group ("group users"), to contribute resources to group funds to make group payments, purchases, and transfer of funds to other groups, individual users, or merchants. In some embodiments, groups make payments as a group from the group fund and, in other embodiments, group payments are made by individual users who are members of the group (i.e., group users). To conduct group transactions, a group transaction application may be downloaded onto a user device, for example a mobile device, which supports the formation of user groups and facilitates payment in group transaction settings.

An embodiment for the group transaction application is configured to permit users to create custom groups and start a group fund (also referred to as a group wallet). Once a group is created, the user that created the group may then request other users to join the group and contribute to the group fund. Once a user creates or joins a group, the user may transfer money into the group fund. Any member of the group fund can initiate a group fund request, which is a means of seeking permission from the other group members, by the initiator of group fund request (referred to as the "group leader"), to use the group fund to make a transaction. The group fund request is transmitted by the group leader to other group members for approval. If approved by the other group members, then the group leader may use some or all of the balance of the group fund to make a purchase.

An embodiment for the group transaction application provides each user in a group setting the ability to select items from the group transaction for individual payment or purchase. The group transaction application affords users in a group setting the ability to individually make a transaction with the merchant. The users are responsible for identifying the specific items each user intends to purchase from the bill provided by the merchant. For example, when a group of people go out to a restaurant and each person orders different food items, those food items might all appear on a single bill. With the group transaction application, each person may select from the bill which food items they want to purchase along with selecting a tip. Each person's bill is automatically calculated by the group transaction application. User(s) may pay the bill via the use of, but not limited to, an identifier such as a quick response (QR) code for scanning, serial number for scanning, or by a near field communication (NFC) device linked with a mobile device.

An embodiment for the group transaction application supports the payment, purchase, and/or transfer of group funds, from both custom groups and non-custom groups, to other group funds, individual persons, or merchants. Additionally, the group transaction application will allow for multi-user payment transactions to take place at the point-of-sale (POS) merchant or online e-commerce.

An embodiment for the group transaction application permits a group fund to carry a balance of cash within the fund. The group fund may show a total group balance as well as display the individual cash balances of each contributing group member. Group members may remove their individual balances from the group fund at any time and group members may exit the group. However, a group member cannot remove the balances of other group members.

An embodiment for the group transaction application provides for a social media presence. When transferring group funds or when making transactions between the group fund and merchants, group members may submit a comment identifying the purpose of the transaction. Group members may submit reviews about their recent business transactions with merchants. The group transaction application will incorporate a way for users to search merchants (i.e., filter for merchants) that accept payment through the group transaction application and to search reviews of merchants.

An embodiment for the group transaction application permits payment for point-of-sale (POS) system transactions and for Automated Clearing House (ACH) transactions.

An embodiment for the group transaction application is that it facilitates a transaction with the use of, but not limited to, NFC devices. NFC devices will work with the group transaction application in order to complete a transaction, as well as provide information to individual group users regarding the purchased items.

An embodiment for the group transaction application has the ability to create custom group fund digital cards that may be sent to the digital wallet of a user's mobile phone. Once the group fund digital card is available in the digital wallet, users simply go to their wallet and select the digital card for a transaction with a merchant by the use of, but not limited to, an NFC device or POS merchant system.

An embodiment for the group transaction application is that it allows for the use of credit card, debit card, bank accounts, and other forms of money transfer and transactions to occur within the group transaction application. For instance, the group transaction application can allow for the use of various cryptocurrencies such as Bitcoin, Ethereum, Verro coin, Verro, Verron, XVO, or the like. Users of the group transaction application can set up one or more payment methods in order to make group purchases with the group transaction application. Users can transfer funds to and from their personal user account at any given time.

An embodiment for the group transaction application is that it allows for group rewards/perks that can be accumulated with each group transaction. The group rewards/perks can be applied towards future group transactions.

As utilized herein, a "payment" refers to a transfer of funds from a user or a group of users to a recipient. The payment may be in a variety of forms such as, but not limited to, electronic funds transfer, automated clearinghouse, credit cards or other form mediated by a payment processing service, digital currency (e.g. cryptocurrency), or the like. The term "merchant" is utilized herein to refer to the recipient of a payment. A merchant, however, is not limited to a retail or service business. Rather, a merchant may include any individual, business, utility, government entity, etc. that is a recipient of a payment.

An overview of the group transaction application, which facilitates the formation of user groups and financial transactions in group settings, has been presented above. The above noted features and embodiments will be described with reference to drawings, wherein like reference numerals are used to refer to like elements throughout.

FIG. 1 shows a general schematic diagram of an exemplary, non-limiting embodiment of a group transaction 100. As shown in FIG. 1, there may be N users in a group, where N is an integer greater than or equal to one. In particular, group users 102a, 102b, 102c, and 102d are members of a group participating in the group transaction 100. The group users 102a, 102b, 102c, and 102d use a group transaction application that is downloaded on an electronic device, such as mobile devices 102a, 102b, 102c, and 102d, respectively, to facilitate the formation of a group and to establish a group fund 106 (also referred to as a group wallet 106). Each group user 102a, 102b, 102c, and 102d contributes money to the group fund 106 from their respective financial institution(s) 104a, 104b, 104c, and 104d, such as a bank. Each user 102a, 102b, 102c, and 102d may contribute money from his own financial institution 104a, 104b, 104c, and 104d to the group fund 106, and each user 102a, 102b, 102c, and 102d may withdraw his/her own money from the group fund 106 at any time. A group user 102a, 102b, 102c, and 102d cannot withdraw money of another group user 102a, 102b, 102c, and 102d. It is worth noting that the group is not limited to a particular size and each group user 102a, 102b, 102c, and 102d does not have to contribute the same amount of resources to the group fund 106. As will be explained in more detail below, any group user 102a, 102b, 102c, and 102d may use group funds 106 to make a purchase on behalf of the group, such as a transaction with a point-of-sale (POS) merchant 108.

Figure 2:
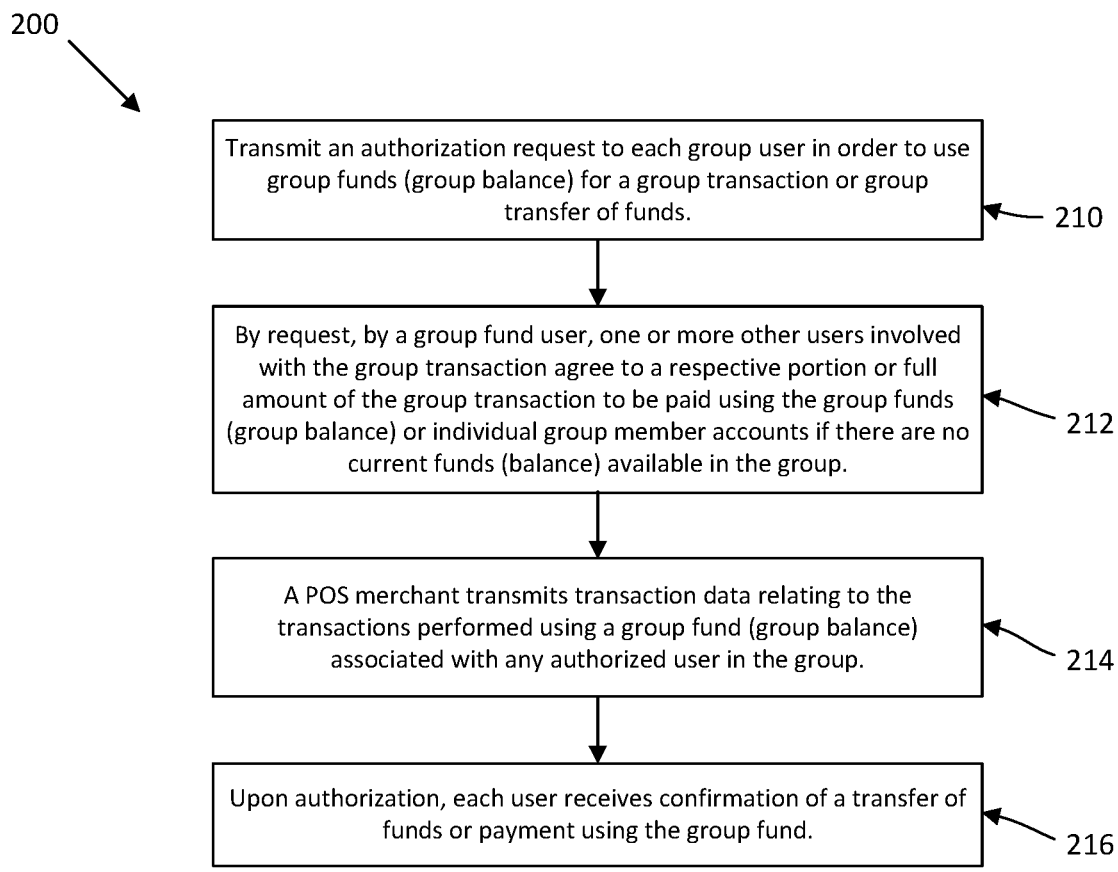
FIG. 2 is a flow diagram of an exemplary, non-limiting method of obtaining group approval to perform the group transaction of FIG. 1.

FIG. 2 shows a flow diagram of an exemplary, non-limiting method 200 of obtaining group approval to perform the group transaction 100. In order for a group user to use group funds for the group transaction 100 or to transfer group funds, the group user must obtain permission from other group members. At 210, to obtain permission, the group user transmits an authorization request, via the group transaction application, to each group user seeking permission to use the group funds for a group transaction or group transfer of funds. The other group users must approve the group fund request before the group user responsible for originating the group fund request, referred to as the "group leader", may utilize group funds to make the purchase. At 212, after a group fund request by a group user, one or more other group users may agree to pay a respective portion or the full amount of the group transaction 100 using the group funds or, in the event there are no funds currently available in the group fund, the accounts of individual group users. At 214, a point-of-sale (POS) merchant transmits transaction data, via the group transaction application, relating to the transactions performed using the group fund associated with any authorized group user. At 216, upon authorization, each group user receives confirmation of a transfer of funds or payment via the group fund.

Figure 3:
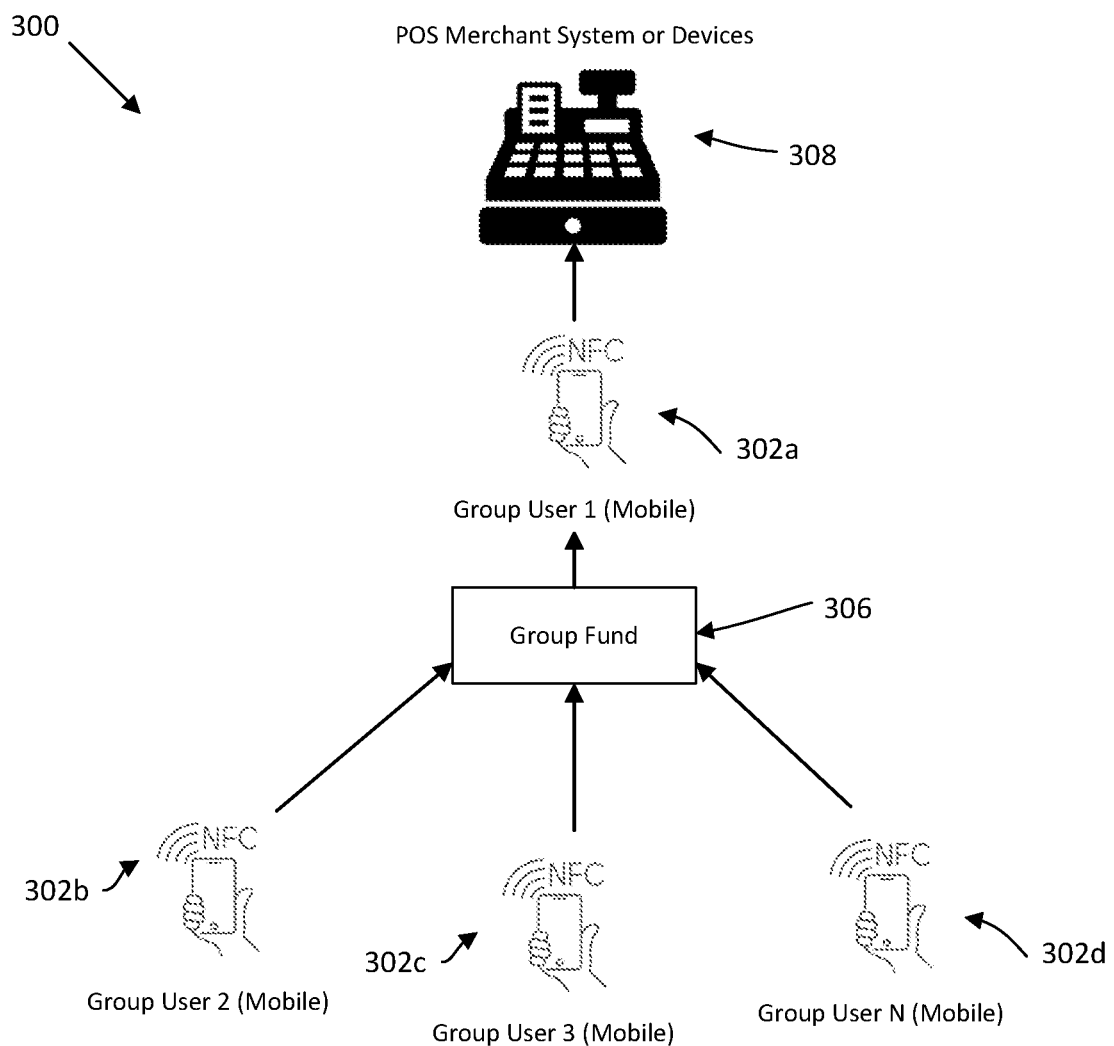
FIG. 3 is a flow diagram of an exemplary, non-limiting embodiment of a group user performing a transaction using group funds.

FIG. 3 shows a flow diagram of an exemplary, non-limiting embodiment 300 of a group user 302a performing a transaction using group funds 306. Group users 302a, 302b, 302c, and 302d each contribute funds to the group fund 306 of which they are group members using the group transaction application. The group transaction application may be downloaded on an electronic device such as, for example, a mobile device. As described above, group user 1 302a performs the preliminary step of requesting permission from the other group members 302b, 302c, and 302d to utilize group funds 306 to make a transaction on behalf of the group. Group users 302b, 302c, and 302d (e.g. 2 through N) provide approval to group user 1 302a to utilize group funds 306 to make the transaction. Group user 1 302a, with the aid of the group transaction application, completes the transaction with the POS merchant system or digital device 308 with money from the group fund 306.

Figure 4:
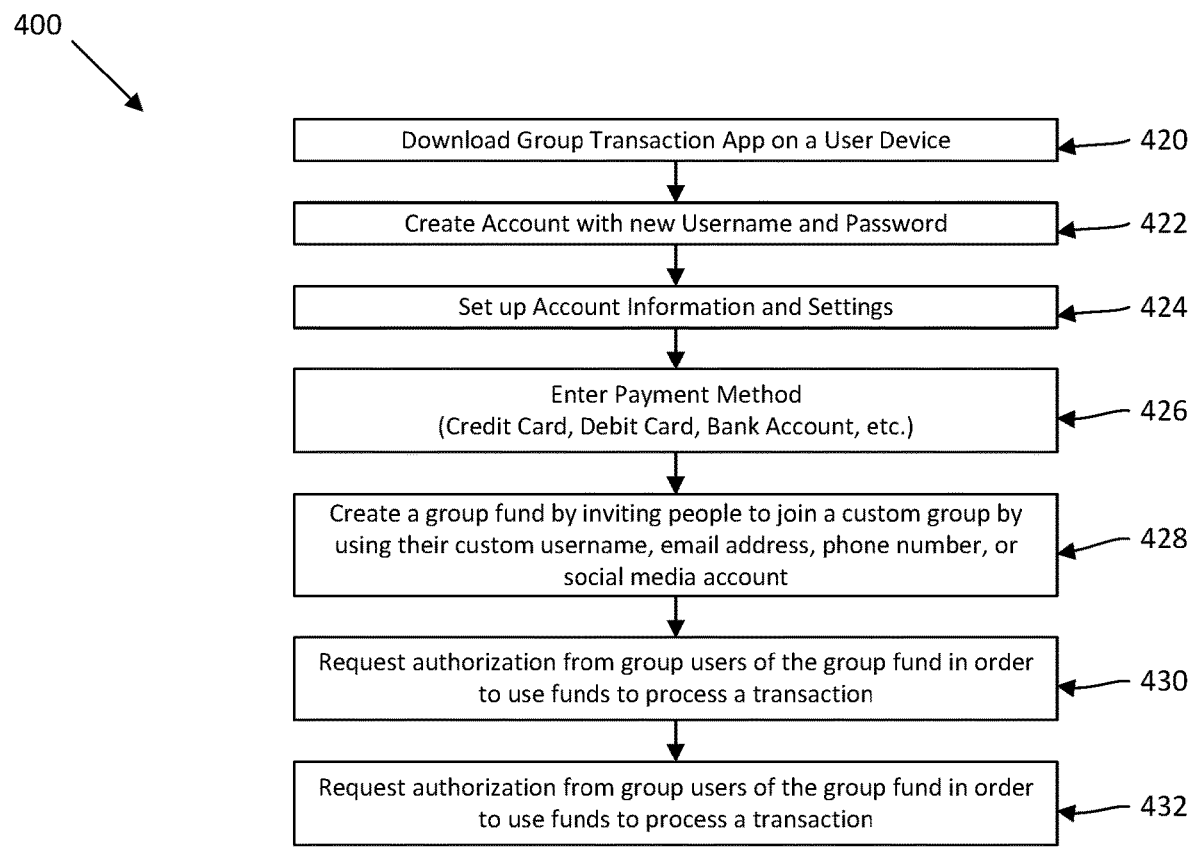
FIG. 4 is an exemplary, non-limiting method of setting up a group transaction application on a user's device to perform group fund transactions.

FIG. 4 shows an exemplary, non-limiting method 400 of setting up a group transaction application on a user's device to perform group fund transactions. At 420, a user downloads the group transaction application onto an electronic device. The device may be a mobile device such as a smart phone, tablet, a wearable such as a watch computing device or smart glasses, laptop, etc. At 422, once installed on the user's device, the user creates an account with a username and password. At 424, the user then sets up the account by providing any necessary information and by personalizing account settings. At 426, the user then connects their account with a financial institution by entering a payment method. The payment method may be a credit card, debit card, bank account, etc. At 428, the user creates a group fund by inviting other users to join their custom group organized under their custom username, email address, phone number, and/or social media account. At 430, the user may then request authorization from group users of the group fund to use group funds to process a transaction. At 432, a POS merchant transmits transaction data to each group users device via the group transaction application.

Figure 5:
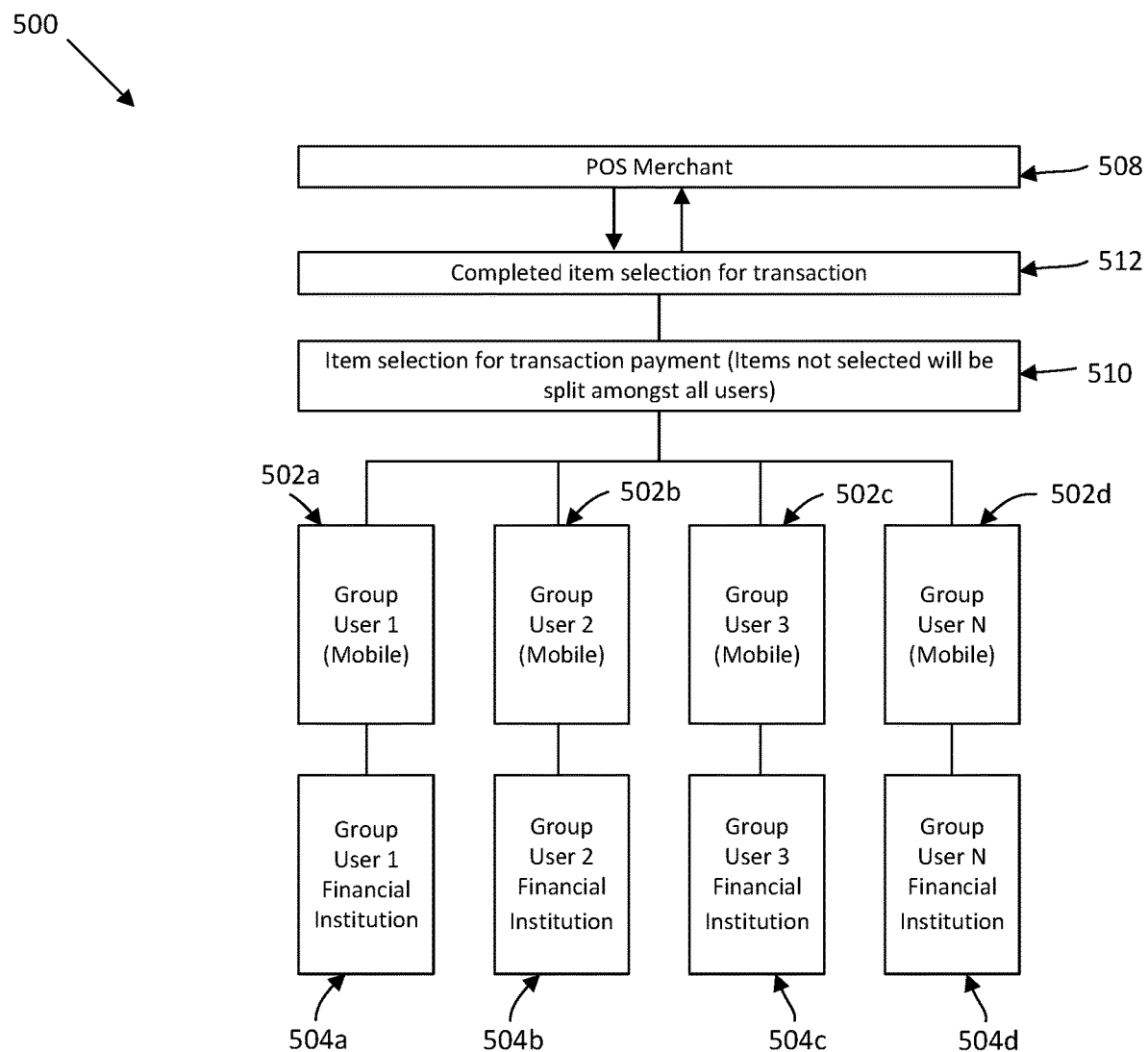
FIG. 5 is a general schematic diagram of an exemplary, non-limiting embodiment of an individual user transaction in a group transaction setting according to one or more aspects.

FIG. 5 shows a general schematic diagram of an exemplary, non-limiting embodiment 500 of an individual user transaction in a group transaction setting. Group users 502*a*, 502*b*, 502*c*, and 502*d* (e.g. users 1 through N) are members of a group. As described above, the group users 502*a*, 502*b*, 502*c*, and 502*d* use a group transaction application that is downloaded on an electronic device, for example a mobile device, to facilitate the formation of the group and to each contribute money to a group fund from their respective financial institution(s) 504*a*, 504*b*, 504*c*, and 504*d*, such as a bank. Each user 502*a*, 502*b*, 502*c*, and 502*d* may contribute money from his own financial institution 504*a*, 504*b*, 504*c*, and 504*d* to the group fund, and each user 502*a*, 502*b*, 502*c*, and 502*d* may withdraw his/her own money from the group fund at any time. A group user 502*a*, 502*b*, 502*c*, and 502*d* cannot withdraw money of another group user 502*a*, 502*b*, 502*c*, and 502*d*. The group is not limited to a particular size and each group user 502*a*, 502*b*, 502*c*, and 502*d* does not have to contribute the same amount to the group fund. As will be explained in more detail below, the group transaction application is designed at 510 to allow item selection by a group user 502*a*, 502*b*, 502*c*, and 502*d* in a group transaction setting. Any group user 502*a*, 502*b*, 502*c*, and 502*d* may choose to pay only for particular items in a group transaction setting with a point-of-sale (POS) merchant 508 (i.e., a portion of the total cost of the group transaction with the POS merchant). In this instance at 510, each group user 502*a*, 502*b*, 502*c*, and 502*d* selects items from the merchant's bill to pay for using his or her respective portion of the group funds or, in the event he or she has no funds currently available in the group fund, the individual account of the respective group user. The group transaction application automatically calculates the cost for each individual group user based on the cost of the items selected by the user and permits each group user to include a tip, if so desired. Any item not selected by a group user is split equally amongst all users. Additionally, any item selected by more than one group user is split equally among the group users who selected the item. At 512, once item selection is completed by group users 502*a*, 502*b*, 502*c*, and 502*d*, the group transaction application completes the group transaction 500 with the POS merchant 508.

Figure 6:
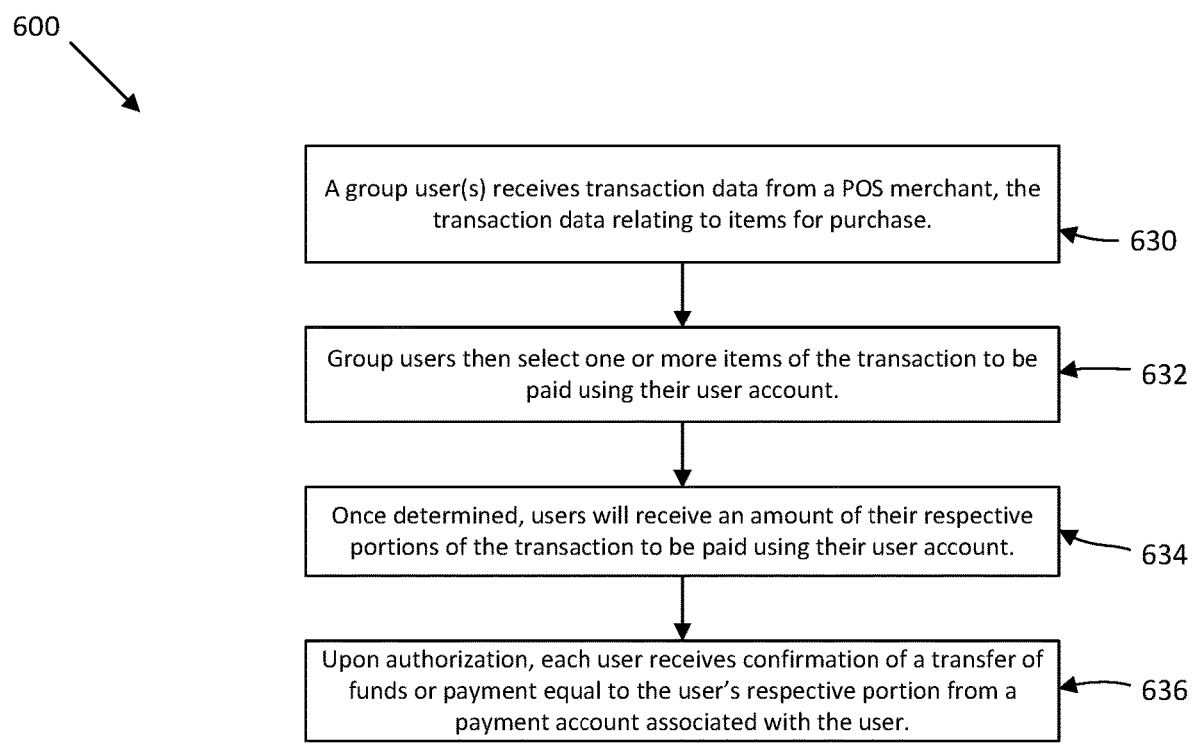
FIG. 6 is a flow diagram of an exemplary, non-limiting method of item selection by a individual group user in the group transaction setting of FIG. 5.

FIG. 6 shows a flow diagram of an exemplary, non-limiting method 600 of item selection by an individual group user in a group transaction setting 500. In order to select items to pay for, a group user must be able to identify the items and the associated cost of the items. At 630, the group user(s) receive transaction data from the POS merchant with the transaction information identifying the items for purchase and the cost of each item. At 632, group user(s) then selects one or more items of the transaction for payment using his or her user account. At 634, once group users have selected items, the group transaction application automatically determines the amount each user is responsible for paying from their user account and sends that amount to the respective group user. At 636, upon authorization by the group user and subsequent payment, each group user receives confirmation of a transfer of funds or payment equal to the user's respective portion of the transaction from a payment account associated with the respective user.

In an exemplary, non-limiting embodiment, the group transaction application can be configured to accept a plurality of fiat currencies and can automatically convert the plurality of fiat currencies to a desired (preferred) currency. For example, group users 502*a*, 502*b*, 502*c*, 502*d* can each contribute money from his or her own financial institution 504*a*, 504*b*, 504*c*, and 504*d*, and each contribution need not be the same fiat currency as the next. For instance, group users 502*a* and 502*b* can contribute to the group fund with U.S. currency, group user 502*c* may contribute using Bitcoin, and group user 502*d* may contribute using Verro coin. The group transaction application can convert contributions from group users 502*a*, 502*b*, 502*c*, 502*d* to a single preferred currency as selected by the merchant, for example. It should be appreciated that the group transaction application can allow group users from different locations and/or with different forms of currency to contribute to a group fund using their preferred method of payment and currency. The group transaction application can then provide payment to the merchant by converting the group funds to the merchant's preferred currency.

Figure 7:
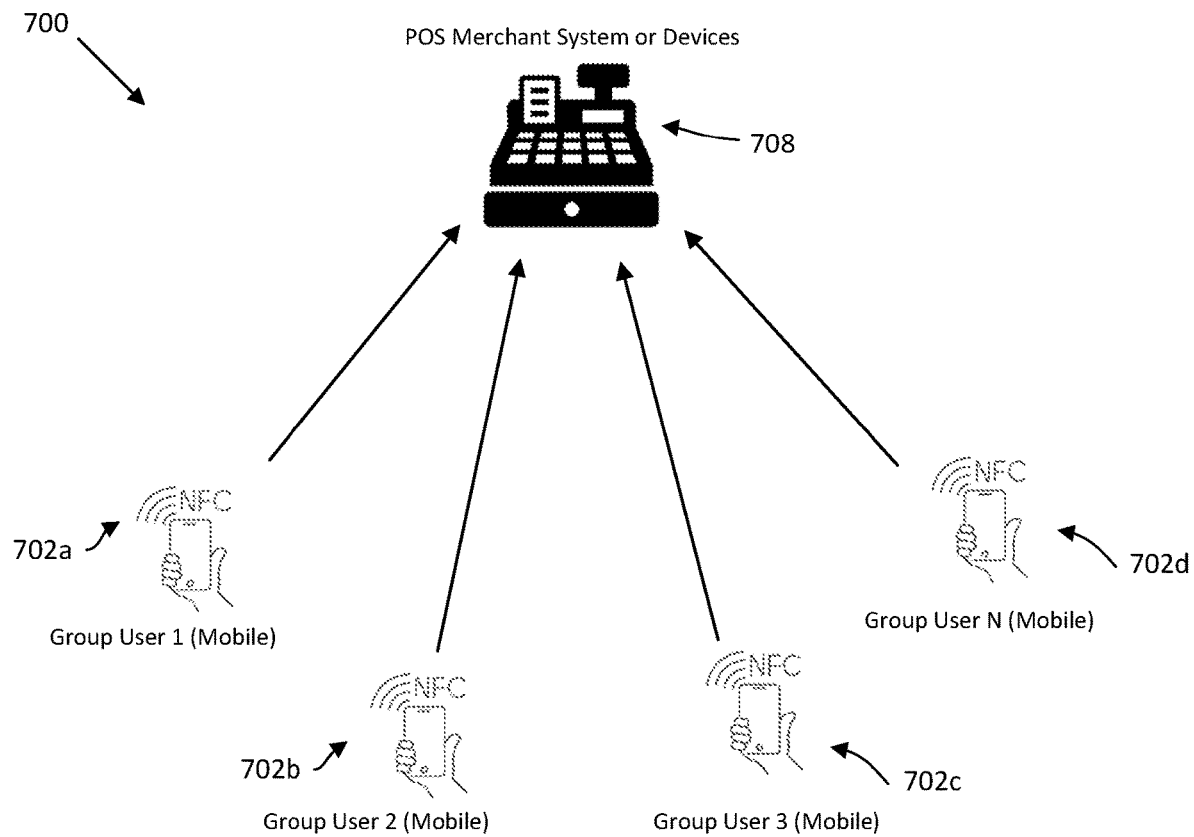
FIG. 7 is an exemplary, non-limiting embodiment of individual group users transacting in a group setting.

FIG. 7 shows an exemplary, non-limiting embodiment 700 of individual group users 702*a*, 702*b*, 702*c*, and 702*d* transacting in a group setting. Group users 702*a*, 702*b*, 702*c*, and 702*d* (e.g. users 1 through N) each use the group transaction application to select items for purchase and to pay only for those respective items with the POS merchant 708 with payment from an account associated with each respective user. The group transaction application may be downloaded on an electronic device such as, for example, a mobile device. Each user device 702*a*, 702*b*, 702*c*, and 702*d* communicates with the system or digital devices of the POS merchant 708 via the group transaction application.

In an exemplary, non-limiting embodiment, the group transaction application can be configured to accept a plurality of fiat currencies and can automatically convert the plurality of fiat currencies to a desired (preferred) currency. For example, group users 702*a*, 702*b*, 702*c*, 702*d* can each pay from his or her own financial institution 704*a*, 704*b*, 704*c*, and 704*d* using the currency of his or her choosing. For instance, group users 702*a* and 702*b* can pay the merchant with U.S. currency, group user 702*c* may pay using Bitcoin, and group user 702*d* may pay using Verro coin. The group transaction application can convert payments from group users 702*a*, 702*b*, 702*c*, 702*d* to a preferred currency as selected by the merchant, for example. It should be appreciated that the group transaction application can allow group users from different locations and/or with different forms of currency to make a payment to a merchant using their preferred method of payment and currency. Upon payment, the group transaction application can automatically convert the payment (if necessary) to a preferred currency of the merchant.

Figure 8:
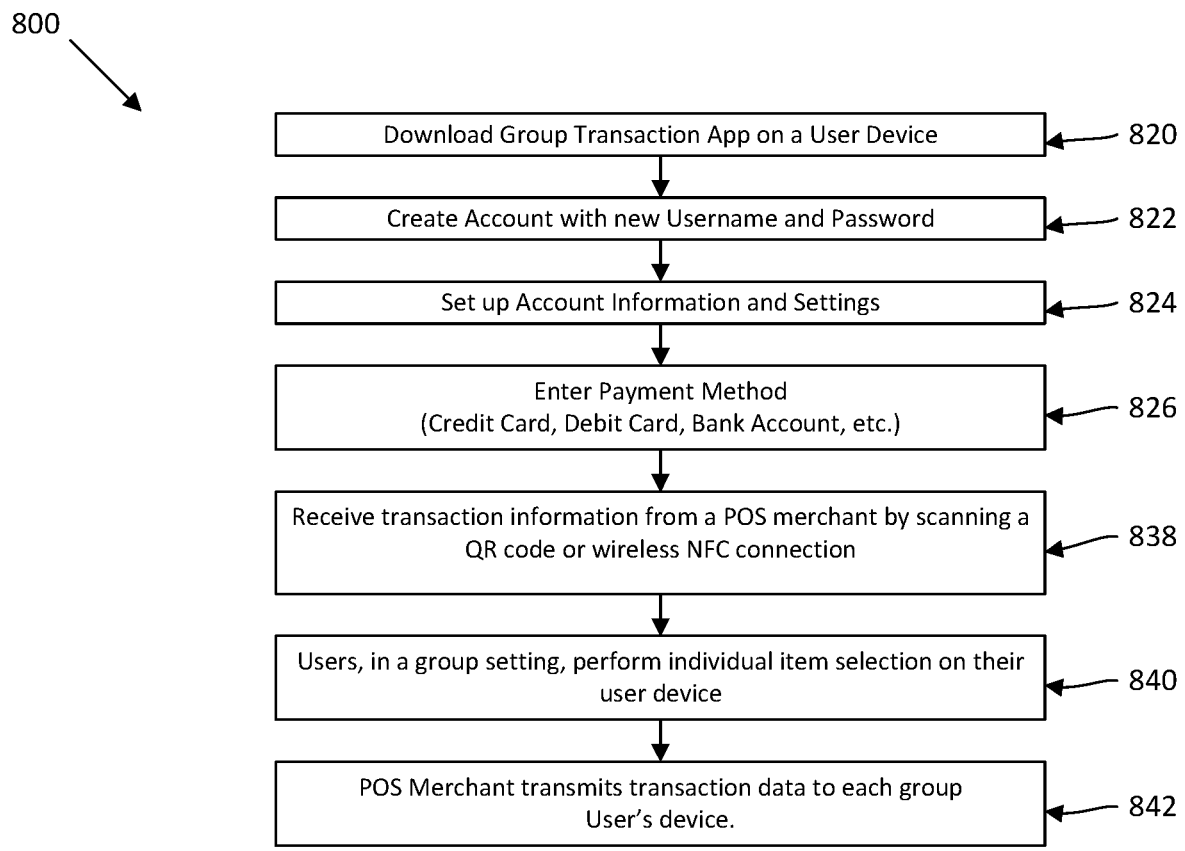
FIG. 8 is an exemplary, non-limiting method of setting up a group transaction application on a user's device to perform a transaction by the group user in a group transaction setting.

FIG. 8 shows an exemplary, non-limiting method 800 of setting up a group transaction application on a user's device to perform a transaction by the group user in a group transaction setting. At 820, a user downloads the group transaction application onto an electronic device. The device may be a mobile device such as a smart phone, tablet, watch computing device, laptop, etc. At 822, once installed on the user's device, the user creates an account with a username and password. At 824, the user then sets up the account by providing any necessary information and by personalizing account settings. At 826, the user connects their account with a financial institution by entering a payment method. The payment method may be a credit card, debit card, bank account, etc. At 838, in the group transaction setting, the user receives transaction information from a POS merchant via scanning a QR code or by wireless NFC connection. At 840, the group user performs individual item selection with their user device. The group transaction application automatically calculates the total for the group user based on the items selected. At 842, the POS merchant transmits transaction data to each group user's device.

Figure 9:
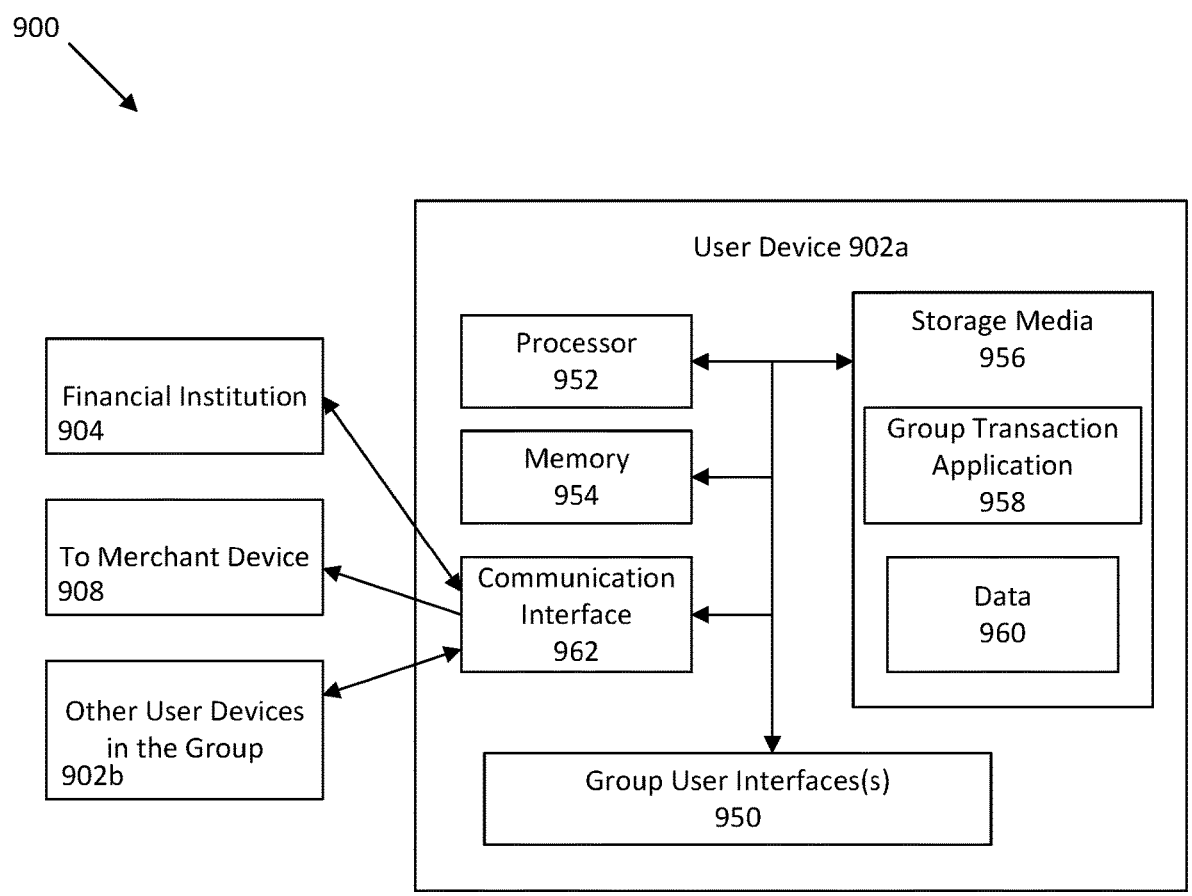
FIG. 9 is a schematic block diagram of an exemplary, non-limiting embodiment of a user device including the group transaction application installed (i.e., downloaded) on the user device.

FIG. 9 illustrates a schematic block diagram of an exemplary, non-limiting embodiment 900 of a user device 902a including the group transaction application 958 installed (i.e., downloaded) on the user device 902a. The user device 902a includes one or more processor(s) 952 configured to execute computer-executable instructions such as instructions composing the group transaction application 958. Such computer-executable instructions can be stored on one or more computer-readable media including non-transitory, computer-readable storage media such as memory 954 or storage 956. For instance, storage 956 can include non-volatile storage to persistently store the group transaction application 958 and/or data 960 such as financial data, transaction history data, and merchant data. Memory 954 can also include volatile storage that stores instructions, other data (working data or variables), or portions thereof during execution of group transaction application 958 by processor 952. The group transaction application 958 may be a web browser application or a native application configured to access the group funds via an API.

The user device 902a further includes a communication interface 962 to connect the user device 902a, via the Internet or other communications network, to the merchant device 908, one or more financial institutions 904, and/or other user devices of group members 902b. Communication interface 962 can be a wired or wireless interface including, but not limited to, a WiFi interface, a Bluetooth interface, a cellular radio interface, a satellite interface, a fiber optic interface, etc. User device 902a can further include a group user interface 950 that displays the graphical user interface (GUI) of the group transaction application 958, often in the form of a mobile application, and permits user input and user output. For instance, group user interface 950 can comprise a touch display which operates as both an input device and an output device. In addition, group user interface 950 can also include various buttons, switches, keys, etc. by which a user can input information to user device 902a; and other displays, LED indicators, etc. by which other information can be output to the user. Further still, group user interface 950 can include input devices such as pointing devices.

In accordance with an embodiment, user device 902a is a computing device, which is readily carried by a user, such as a smartphone or tablet device. However, it is to be appreciated that user device 902a can be other portable form-factors such as a laptop computer, a convertible laptop, a watch computing device, smart glasses, or the like. Moreover, user device 902a can be a less portable computing device such as a desktop computer. That is, group transaction application 958 can be installed and executed on substantially any computing device provided that such a computing device can communicate with the financial institutions 904, merchant devices 908, and other user devices of group members 902b, as described herein.

Figure 10:
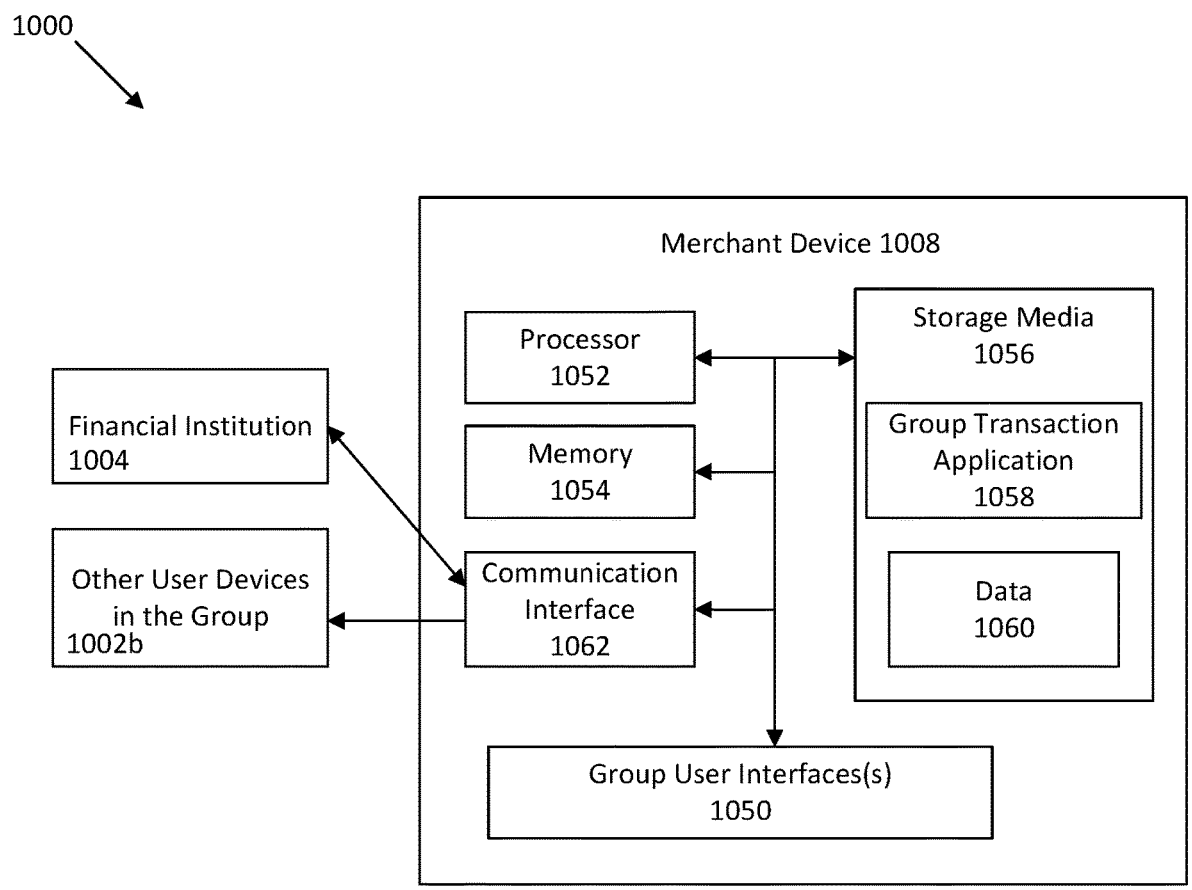
FIG. 10 is a schematic block diagram of an exemplary, non-limiting embodiment of a merchant device including the group transaction application installed (i.e., downloaded) on the merchant device.

FIG. 10 illustrates a schematic block diagram of an exemplary, non-limiting embodiment 1000 of a merchant device 1008 including the group transaction application 1058 installed (i.e., downloaded) on the merchant device 1008. The merchant device 1008 includes one or more processor(s) 1052 configured to execute computer-executable instructions such as instructions composing the group transaction application 1058. Such computer-executable instructions can be stored on one or more computer-readable media including non-transitory, computer-readable storage media such as memory 1054 or storage 1056. For instance, storage 1056 can include non-volatile storage to persistently store the group transaction application 1058 and/or data 1060 such as transaction data and transaction history data. Memory 1054 can also include volatile storage that stores instructions, other data (working data or variables), or portions thereof during execution of group transaction application 1058 by processor 1052. The group transaction application 1058 may be a web browser application or a native application configured to receive payment from user funds or group funds via an API.

The merchant device 1008 further includes a communication interface 1062 to connect the merchant device 1008, via the Internet or other communications network, to one or more financial institutions 1004 and/or user devices of group members 1002b. Communication interface 1062 can be a wired or wireless interface including, but not limited to, a WiFi interface, a Bluetooth interface, a cellular radio interface, a satellite interface, a fiber optic interface, etc. Merchant device 1008 can further include a merchant user interface 1050 that displays the graphical user interface (GUI) of the group transaction application 1058 and permits user input and merchant output. For instance, merchant user interface 1050 can comprise a touch display, which operates as both an input device and an output device. In addition, merchant user interface 1050 can also include various buttons, switches, keys, etc. by which a user can input information to merchant device 1008; and other displays, LED indicators, etc. by which other information can be output to the user. Further still, merchant user interface 1050 can include input devices such as pointing devices.

In accordance with an embodiment, merchant device 1008 is a computing device, which is a digital payment device, such as a smartphone, tablet device, or NFC payment device. That is, group transaction application 1058 can be installed and executed on substantially any computing device provided that such a computing device can communicate with the financial institutions 1004 and user devices of groups 1002b, as described herein.

The group transaction application 958 configures the user device 902a to allow for group-to-group (G2G) fund transfer or transaction with another group fund, individual person, or merchant. The software will allow for a multi-user payment transaction to take place at the POS merchant or online e-commerce.

Referring now to FIGS. 11-12, there are illustrated two embodiments 1100, 1200 of a graphical user interface (GUI) for the group transaction application. The embodiments 1100, 1200 have a slightly different appearance in terms of the GUI, but operate the same way in conducting a group transaction.

Figure 11A:
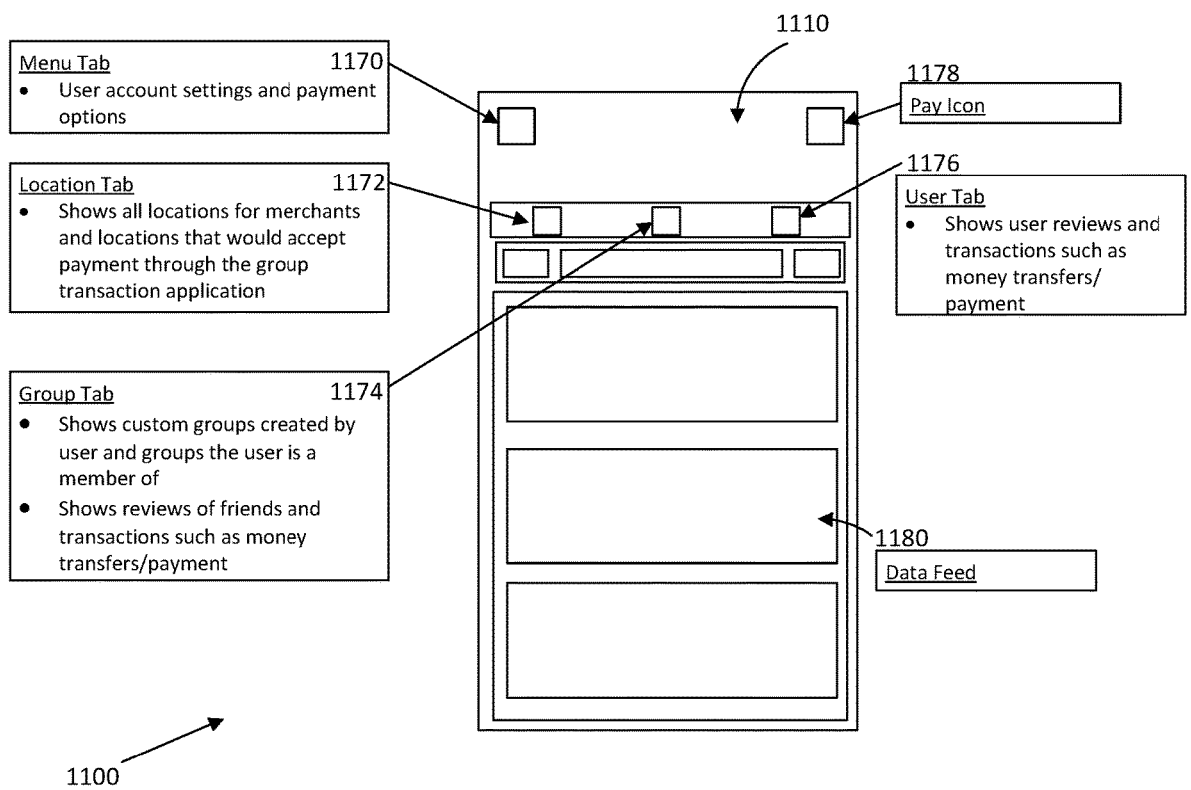
FIG. 11a is a picture of an exemplary, non-limiting first embodiment of a home screen for the group transaction application.
Figure 11B:
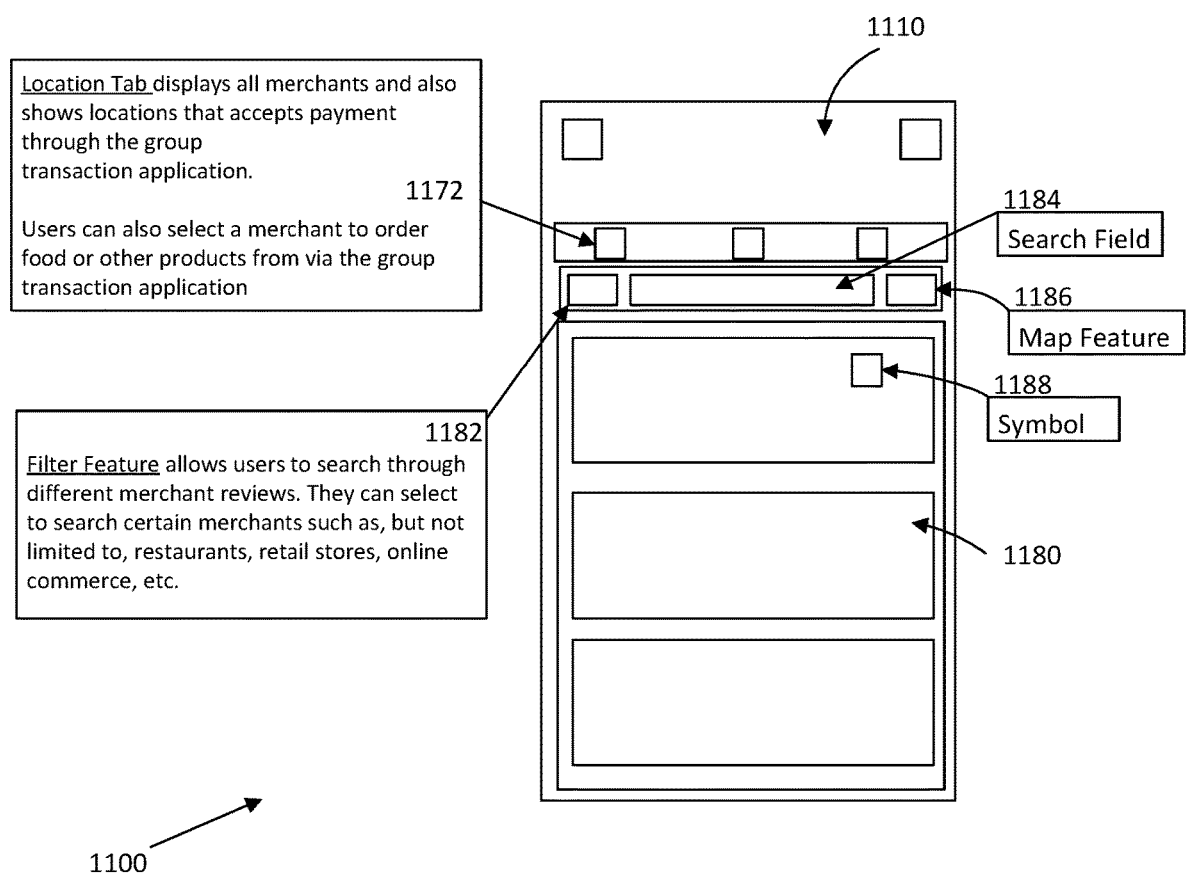

FIGS. 11a-11e show a first embodiment 1100 of a GUI for the group transaction application described above which facilitates the formation of user groups and payment in group transaction settings. FIGS. 11a and 11b show a home screen 1110 of the first embodiment 1100 of the GUI which appears when the application is opened on a user device such as a smartphone. The home screen 1110 may include a number of tabs such as, for example, a menu tab 1170, a location tab 1172, a group tab 1174, and a user tab 1176. Moreover, the GUI may include a pay icon 1178 and a data feed 1180. As will be explained in more detail below, selection of any of the tabs 1170, 1172, 1174, and 1176 changes the content displayed to the user, particularly in the data feed 1180. The data feed 1180 displays data in a navigable list based on the user's selection of tab 1170, 1172, 1174, and 1176.

As will be explained below, the menu tab 1170, when selected by a user, causes the group transaction application to display a menu screen 1120 which permits the user to access account settings and payment options. As will be explained in more detail below, the group tab 1174, when selected by a user, causes the group transaction application to display custom groups created by the user as well as groups which the user is a member of, but did not create. Selection of the group tab 1174 may also result in navigation to a view which displays reviews of friends and transactions, such as money transfers and payments. As will be explained in more detail below, the user tab 1176, when selected by a user, causes the group transaction application to display user reviews and transactions, such as money transfers and payments.

As shown in FIG. 11b, the home screen 1110 also includes a filter feature 1182, a search field 1184, and a map feature 1186. The filter feature 1182 allows users to search through reviews of various merchants. Users can select the filter feature 1182 to search for certain merchants such as, but not limited to, restaurants, retail stores, online e-commerce, etc. The search field 1184 permits user input to search for a particular merchant by name, location, product, etc. The map feature 1186, when selected by a user, displays a map and directions to the location of a merchant.

The location tab 1172, when selected by a user, displays locations for all merchants and provides in the data feed 1180 the locations of any merchants, which accept payment through the group transaction application. A symbol 1188 may be placed next to a merchant's information in the data feed 1180 as a means to identify a merchant that accepts payment through the group transaction application. Users can select a merchant from the data feed 1180 to purchase food or other products with the group transaction application.

Figure 11C:
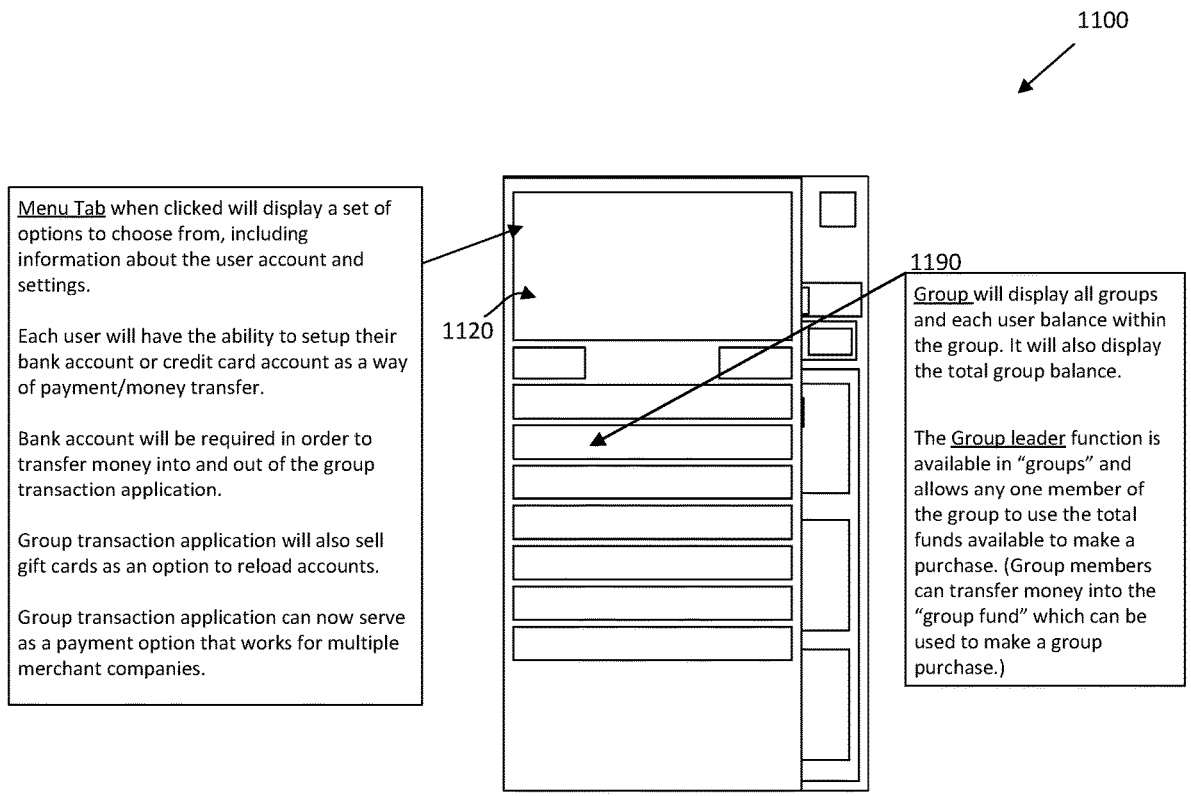
FIG. 11c is an exemplary screenshot of a graphical representation of a menu screen for the first embodiment of the group transaction application.

Referring now to FIG. 11c, there is pictured a menu screen 1120 that appears when a user selects the menu tab 1170. The menu screen 1120 provides a set of options which a user can select from such as, for example, groups 1190, purchases, notifications, account settings, and home. The menu view 1120 provides the user the ability to link the group transaction application with a financial institution, for example, by setting up their bank account or credit card account as a means of payment and/or money transfer. The bank account is required to transfer money into and out of the group transaction application. Additionally, the group transaction application offers users the ability to purchase gift cards as an option to reload accounts. Within the menu screen 1120, a user may select groups 1190 to display all groups the user is a member of as well as to display each user balance within the group. Additionally, selecting groups 1190 shows the total group balance. As will be mentioned in more detail below, groups 1190 has a "group leader" function available which allows any one member of the group to use the total group funds available to make a purchase. As will be explained below, group users can transfer money into the "group fund" which can be used to make a group purchase.

Figure 11D:
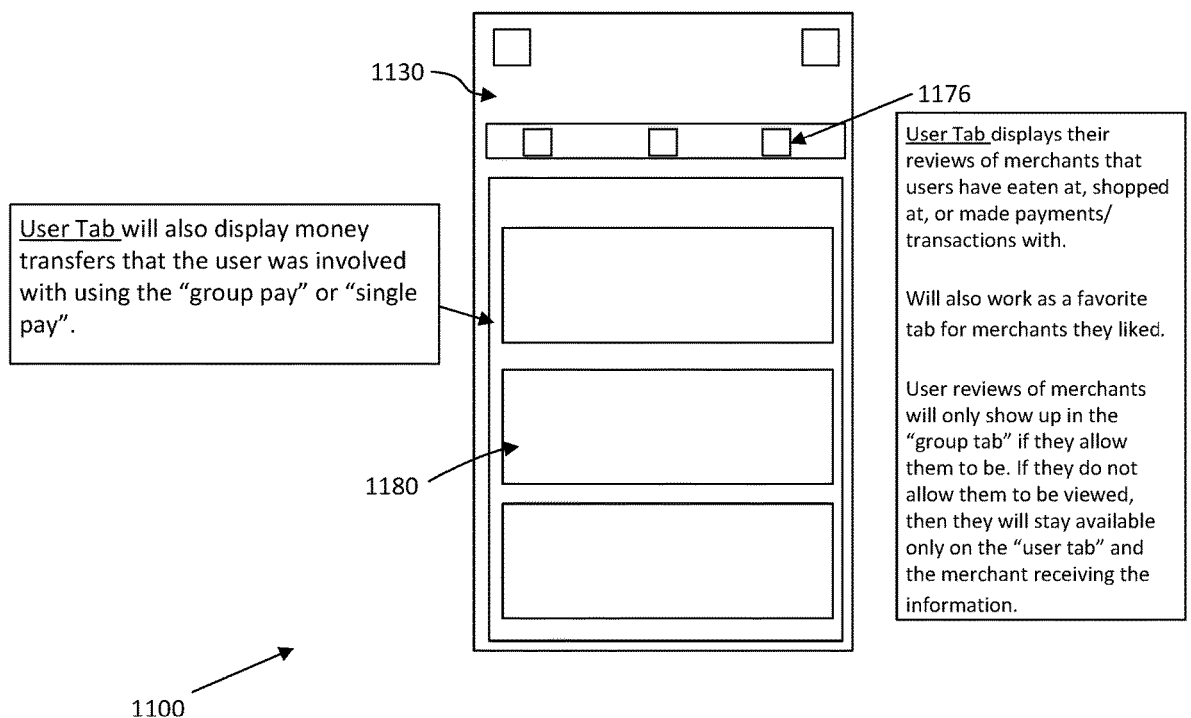
FIG. 11*d* is an exemplary screenshot of a graphical representation of user content after selection of a user tab in the first embodiment of the group transaction application.

Referring now to FIG. 11d, there is pictured user content 1130 after selection of the user tab 1176. The user tab 1176 displays, in the data feed 1180, user reviews of merchants that users have eaten at, shopped at, or made payments/transactions with. The user tab 1176 may also serve as a favorite tab for merchants that the user enjoyed. User reviews of merchants are only visible in the "group tab" 1174 if allowed. If not viewable, reviews are available only on the "user tab" 1176 and the merchant receiving the information. As will be described in more detail below, selection of the user tab 1176 causes the data feed 1180 to display money transfers and purchases that the user was involved in using the "group pay" or "single pay" option.

Figure 11E:
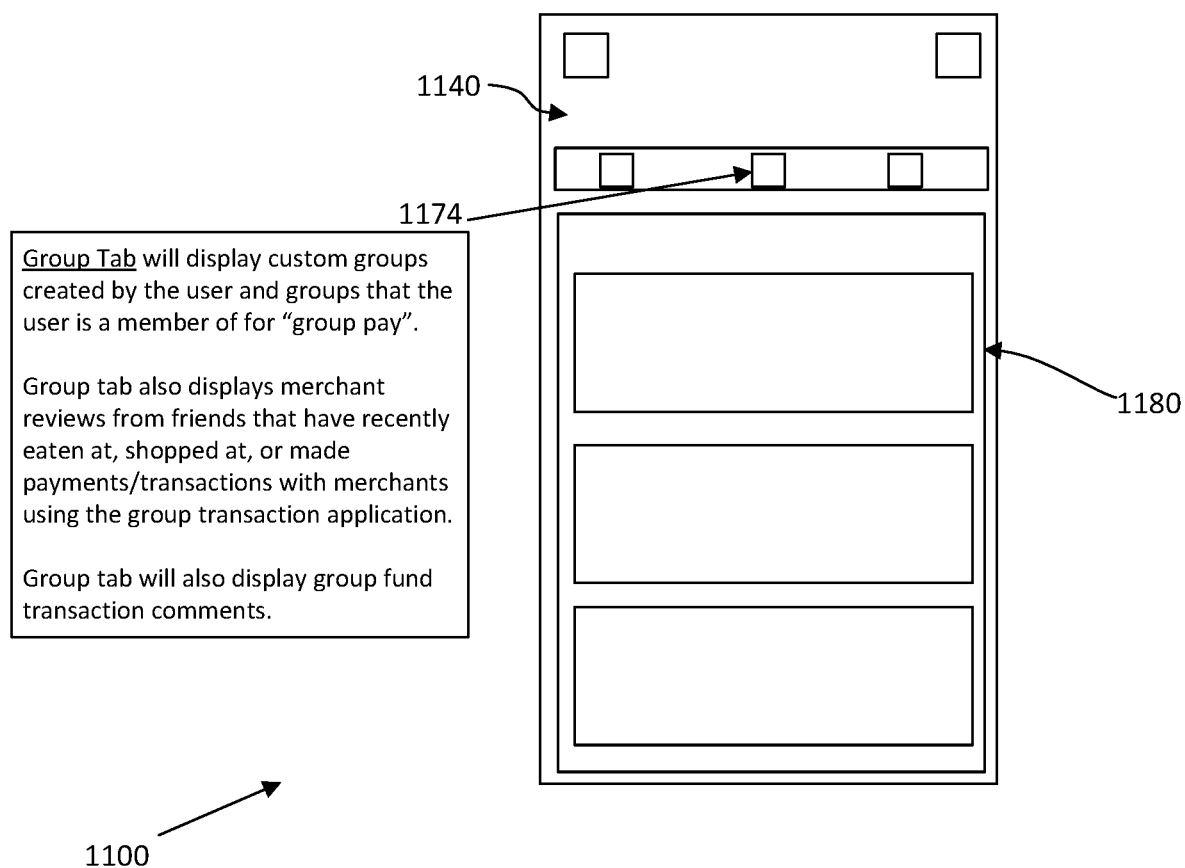
FIG. 11*e* is an exemplary screenshot of a graphical representation of group content after user selection of a group tab in the first embodiment of the group transaction application.

Referring now to FIG. 11e, there is pictured group content 1140 after user selection of the group tab 1174. The group tab 1174 displays, in the data feed 1180, custom groups created by the user as well as groups, which the user is a member of for "group pay", but did not create. The group tab 1174 also displays, in the data feed 1180, merchant reviews from friends that have recently eaten at, shopped at, or made payments/transactions with merchants accepting payment through the group transaction application. Selection of the group tab 1174 also causes the data feed 1180 to display group fund transaction comments.

Figure 12A:
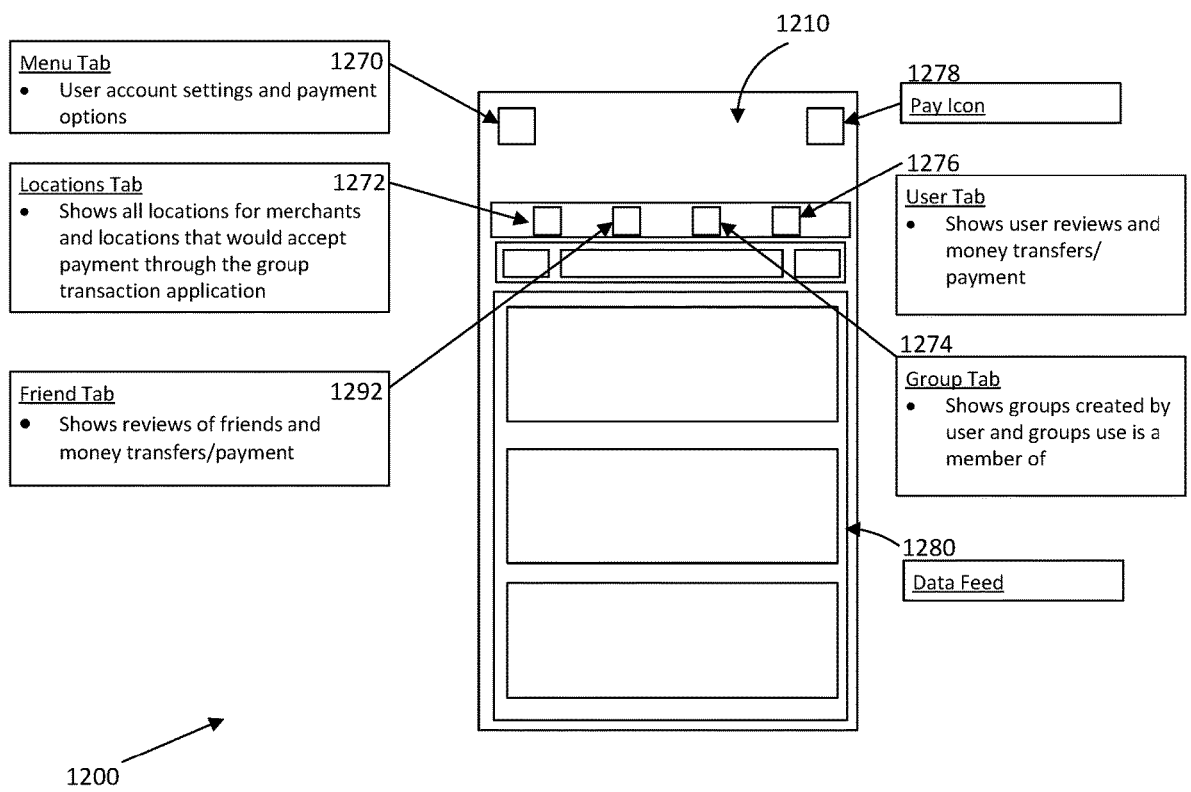
FIG. 12*a* is a picture of an exemplary, non-limiting second embodiment of a home screen for the group transaction application.
Figure 12B:
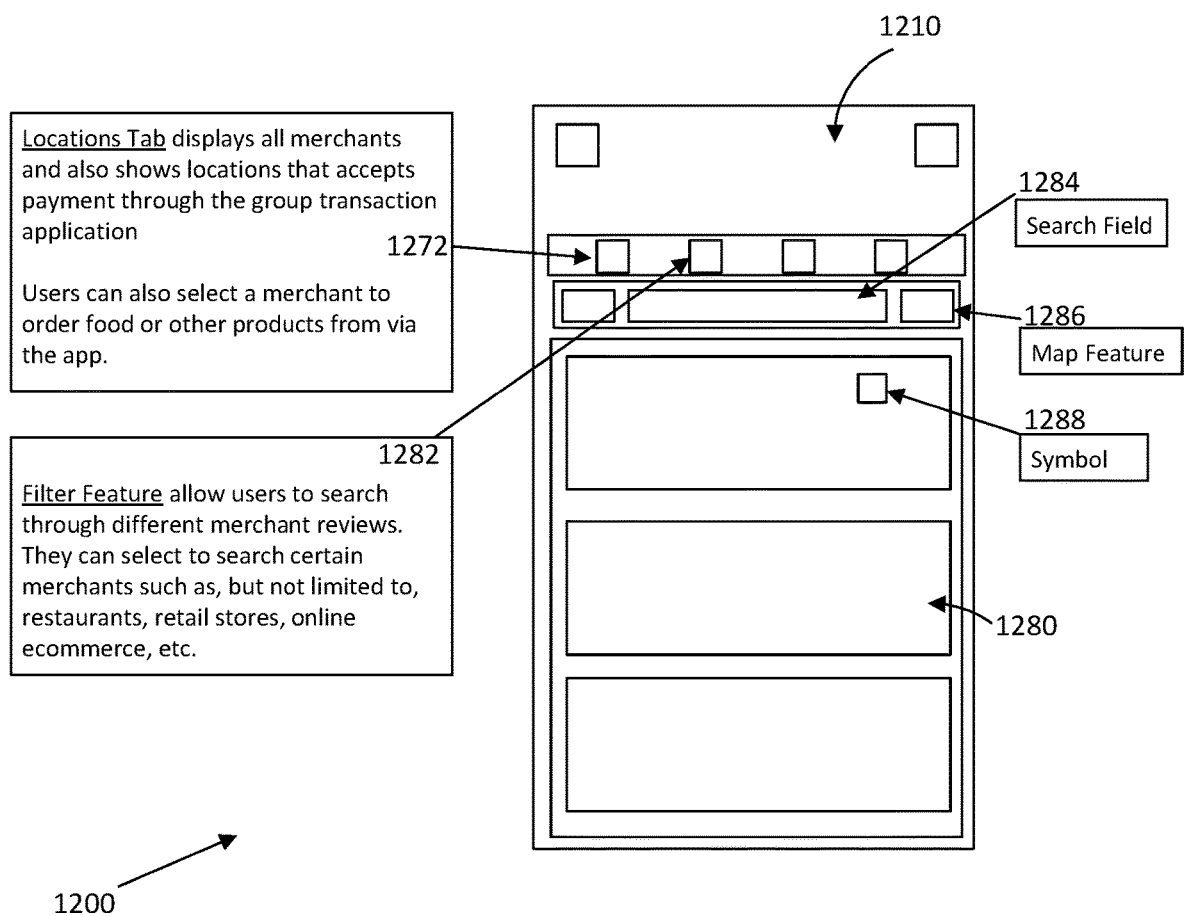
FIG. 12*b* is a picture of the exemplary, non-limiting second embodiment of the home screen for the group transaction application of FIG. 15*a*.

FIGS. 12a-12m show a second embodiment 1200 of a GUI for the group transaction application described above which facilitates the formation of user groups and payment in group transaction settings. FIGS. 12a and 12b shows a home screen 1210 of the second embodiment 1200 of the GUI which appears when the group transaction application is opened on a user device such as a smartphone. The second embodiment 1200 operates similar to the first embodiment 1100 when conducting group transactions with the main difference between the first 1100 and second embodiments 1200 being the second embodiment 1200 includes a friend tab 1292. As a result, note that like reference numerals are used to refer to like elements throughout.

In the second embodiment 1200, the home screen 1210 may include a number of tabs such as, for example, a menu tab 1270, a location tab 1272, a group tab 1274, a user tab 1276, and a friend tab 1292. The friend tab 1292 shows reviews of friends and transactions involve money transfers and payments. Similar to the first embodiment 1100, the second embodiment 1200 of the GUI may include a pay icon 1278 as well as a data feed 1280. The second embodiment 1200 operates similar to the first embodiment 1100 with the selection of any of the tabs 1270, 1272, 1274, 1276, and 1292 presenting the user with content relevant to the selected tab.

As shown in FIG. 12b, the home screen 1210 also includes a filter feature 1282, a search field 1284, and a map feature 1286. All of these features operate identically to the first embodiment 1100. The data feed 1280 displays content in a navigable list based on user selection of the tabs 1270, 1272, 1274, 1276, and 1292.

The location tab 1272, when selected by a user, displays locations for all merchants and provides in the data feed 1280 the locations of any merchants, which accept payment through the group transaction application. A symbol 1288 may be placed next to a merchant's information in the data feed 1280 as a means to identify a merchant that accepts payment via the group transaction application. Users can select a merchant from the data feed 1280 to purchase food or other products with the group transaction application.

As detailed above, the menu tab 1270, when selected by a user, causes the group transaction application to display a menu screen (not shown) which permits the user to access account settings and payment options. The menu tab 1270 of the second embodiment 1200 operates identical to the first embodiment 1100 and may possess the same content.

As will be explained in more detail below, the group tab 1274, when selected by a user, causes the group transaction application to display custom groups created by the user as well as groups which the user is a member of, but did not create. Selection of the group tab 1274 may also result in navigation to a view which displays reviews of friends and transactions, such as money transfers and payments. As will be explained in more detail below, the user tab 1276, when selected by a user, causes the group transaction application to display user reviews and transactions, such as money transfers and payments.

Figure 12C:
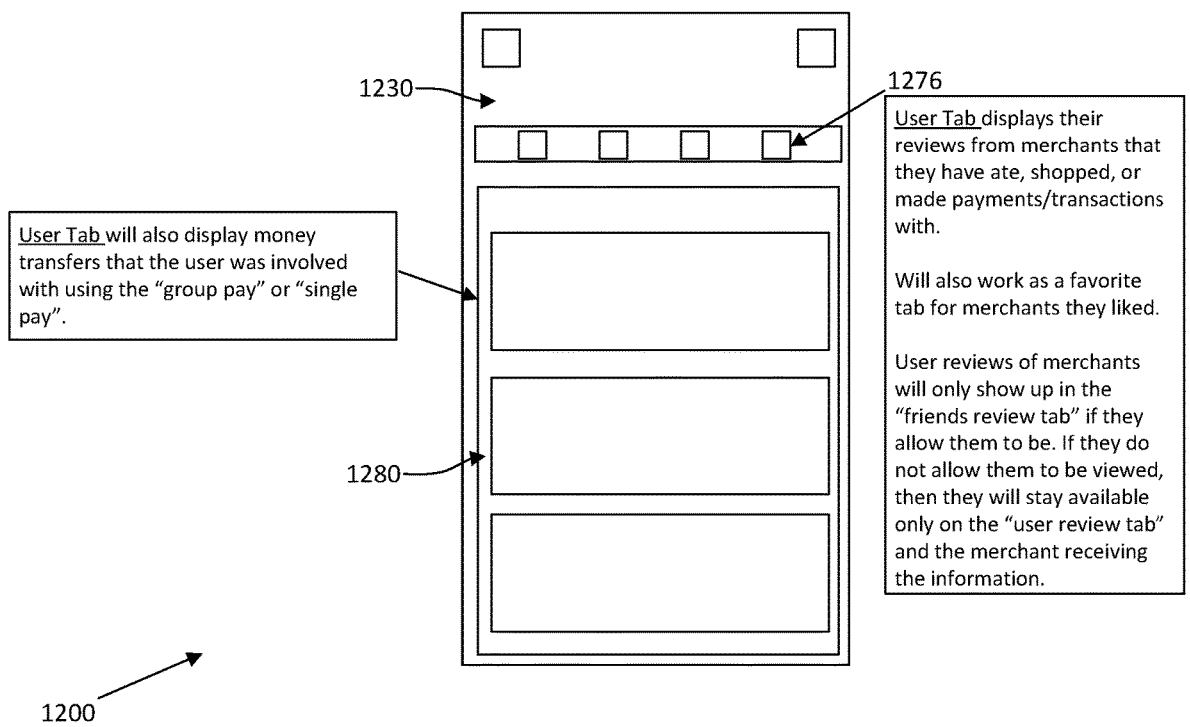
FIG. 12*c* is an exemplary screenshot of a graphical representation of user content after user selection of a user tab in the second embodiment of the group transaction application.

Referring now to FIG. 12*c*, there is pictured user content 1230 after selection of the user tab 1276. The user tab 1276 displays, in the data feed 1280, user reviews of merchants that users have eaten at, shopped at, or made payments/transactions with. The user tab 1276 may also serve as a favorite tab for merchants that the user enjoyed. User reviews of merchants are only visible in the "friends tab" 1292 if allowed. If not viewable, user reviews are available only on the "user tab" 1276 and the merchant receiving the information. As will be described in more detail below, selection of the user tab 1276 causes the data feed 1280 to display transactions that the user was involved in using the "group pay" or "single pay" option.

Figure 12D:
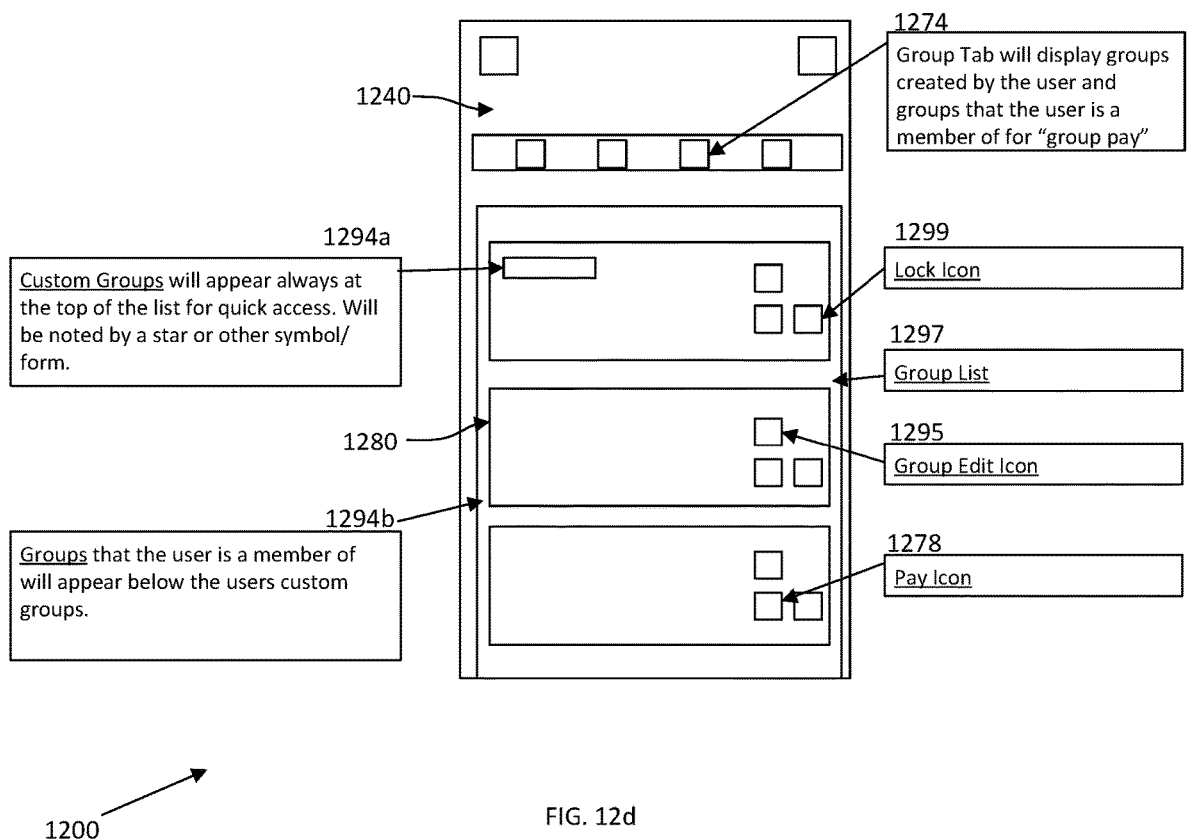
FIG. 12*d* is an exemplary screenshot of a graphical representation of group content after user selection of a group tab in the second embodiment of the group transaction application.

Referring now to FIG. 12*d*, there is pictured group content 1240 after user selection of the group tab 1274. Selection of the group tab 1274 causes the data feed 1280 to display a list of groups (i.e., group list) created by the user 1294*a* and groups that the user is a member of for "group pay" 1294*b*. The custom groups 1294*a* (groups created by the user) appear at the top of the list for quick access and, generally, are noted by a star or other symbol. Groups 1294*b* that the user is a member of, but did not create, appear below the user's custom groups 1294*a*. The group list 1297 may include one or more icons such as a lock icon 1299 (to prevent change), a group edit icon 1295 (to change group information), and a pay icon 1278 to initiate "group pay" from the associated group fund.

Figure 12E:
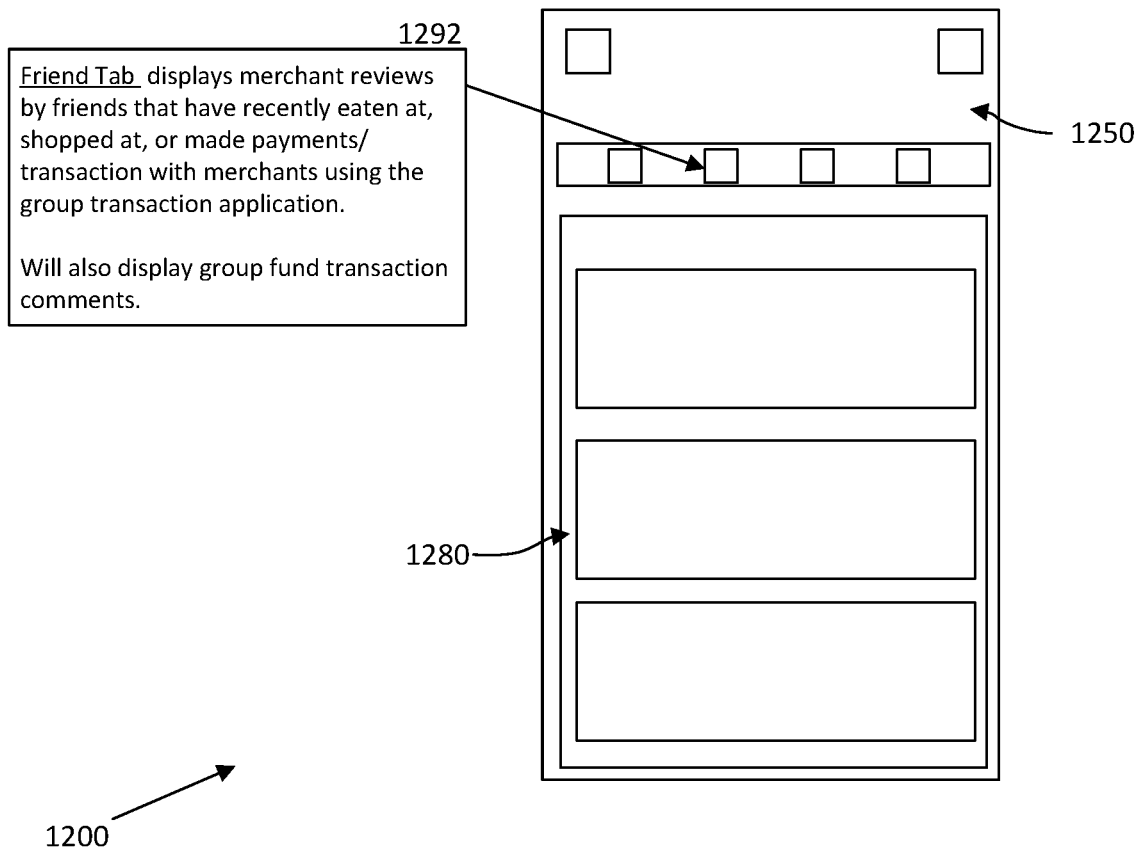
FIG. 12*e* is an exemplary screenshot of a graphical representation of friend content after user selection of a friend tab in the second embodiment of the group transaction application.

Referring now to FIG. 12*e*, there is pictured friend content 1250 after user selection of the friend tab 1292. The friend tab 1292, when selected by a user, causes the data feed 1280 to display merchant reviews by friends that have recently eaten at, shopped at, or made payments/transactions with merchants that accept payment through the group transaction application. Selection of the friend tab 1292 also displays group fund transaction comments.

Figure 12F:
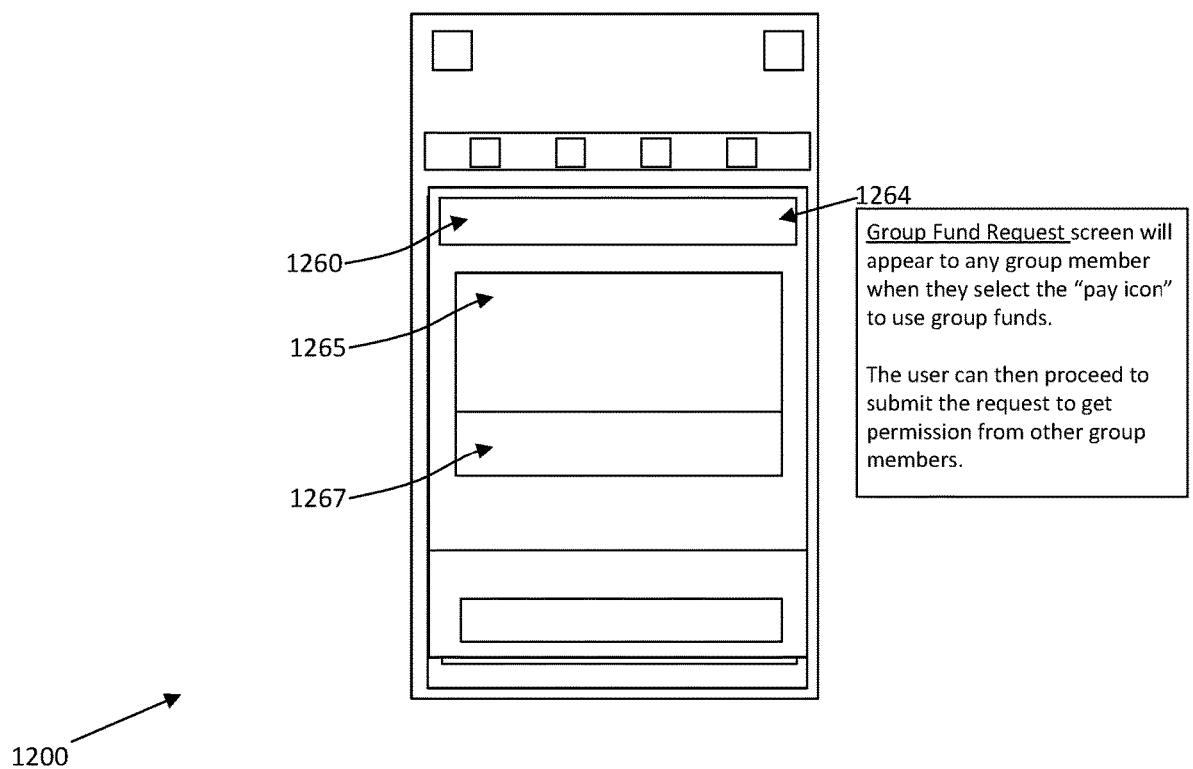
FIG. 12*f* is an exemplary screenshot of a graphical representation of a group fund request in the second embodiment of the group transaction application.

Referring now to FIG. 12*f*, there is pictured a group fund request 1264. The group fund request screen 1260 appears to any group user who selects the pay icon 1278 to conduct a transaction using group funds. The group user submits an authorization request to other group members in order to get permission from the other group members to use the group funds. The group fund request 1264 may include a comment field 1265 and an estimated cost field 1267. The user may input a reason for requesting the funds in the comment field 1265 such as, for example, buying groceries for a party as well as the estimated cost 1267, for example $40.

Figure 12G:
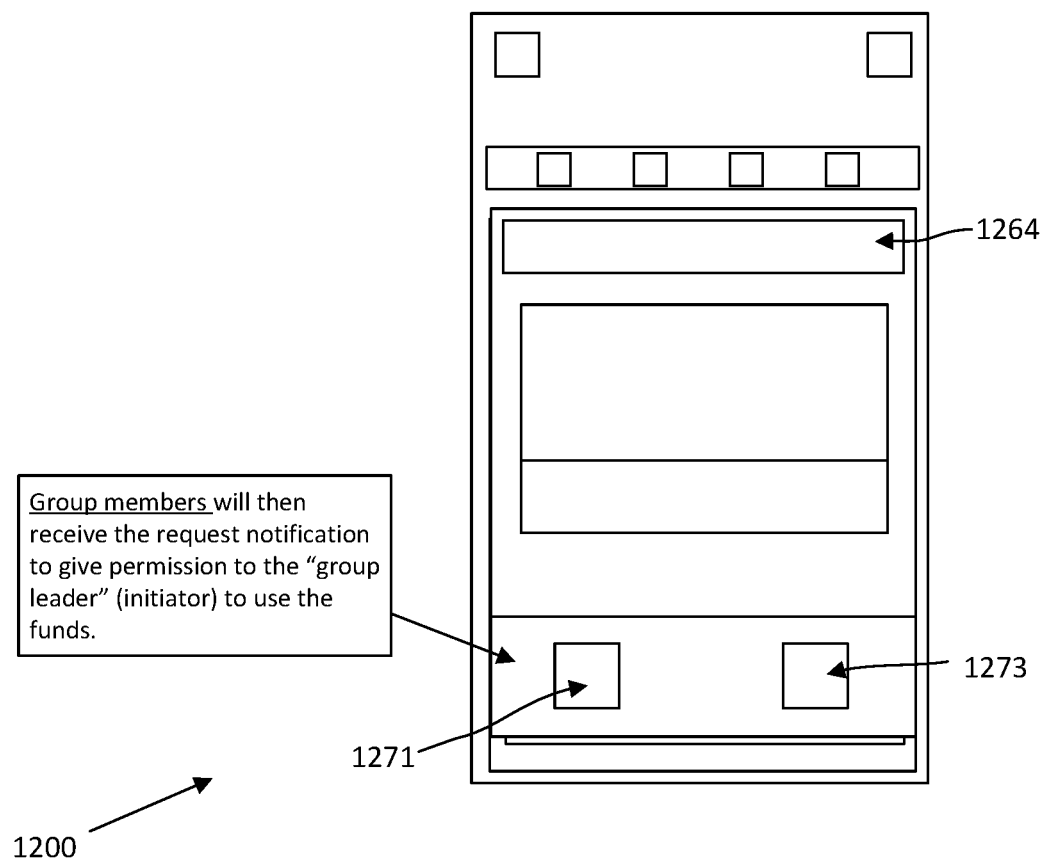
FIG. 12*g* is an exemplary screenshot of a graphical representation of a group fund request as it appears to recipient group users in the second embodiment of the group transaction application.

Referring now to FIG. 12*g*, there is pictured the group fund request 1264 as it appears to the recipients—other group users. The group users then have the option to accept 1271 the group fund request 1264 or deny 1273 the group fund request 1264. Accepting the group fund request 1264 grants permission to the "group leader" (initiator of the group fund request) to use the funds. The "group leader" receives a notification if the "group fund request" 1264 is approved or denied.

Figure 12H:
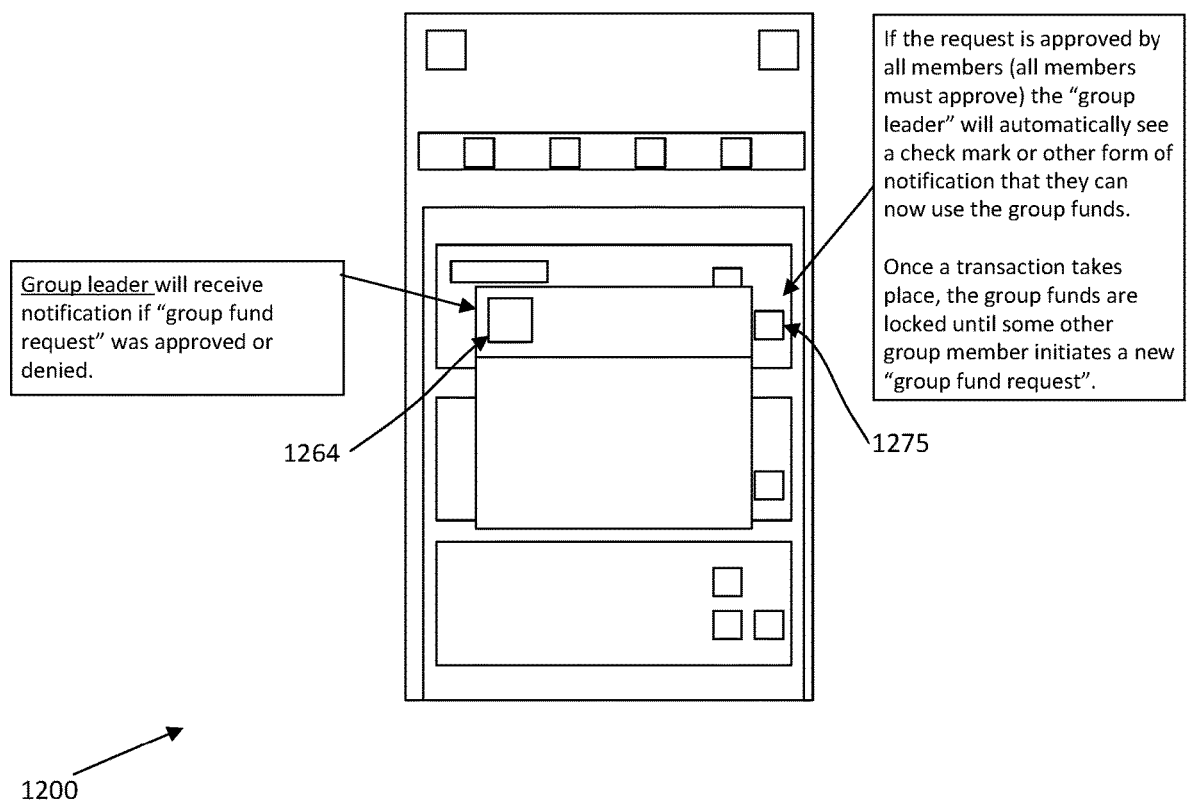
FIG. 12*h* is an exemplary screenshot of a graphical representation of a notification a "group leader" receives if a group fund request is approved in the second embodiment of the group transaction application.

Referring now to FIG. 12*h*, there is pictured a notification the "group leader" receives if the group fund request is approved 1264. If the group fund request is approved by all members (all members must approve) the "group leader" will automatically see a check mark 1275 or other form of notification that they can access and use the group funds. However, it should be noted in other embodiments, the "group leader" may access the group funds if a majority of the group members approve the group fund request. In yet another embodiment, the "group leader" may be limited to only the portion of the group funds belonging to the approving group members. Once a transaction takes place, the group funds are locked until some other group member initiates a new group fund request.

Figure 12I:
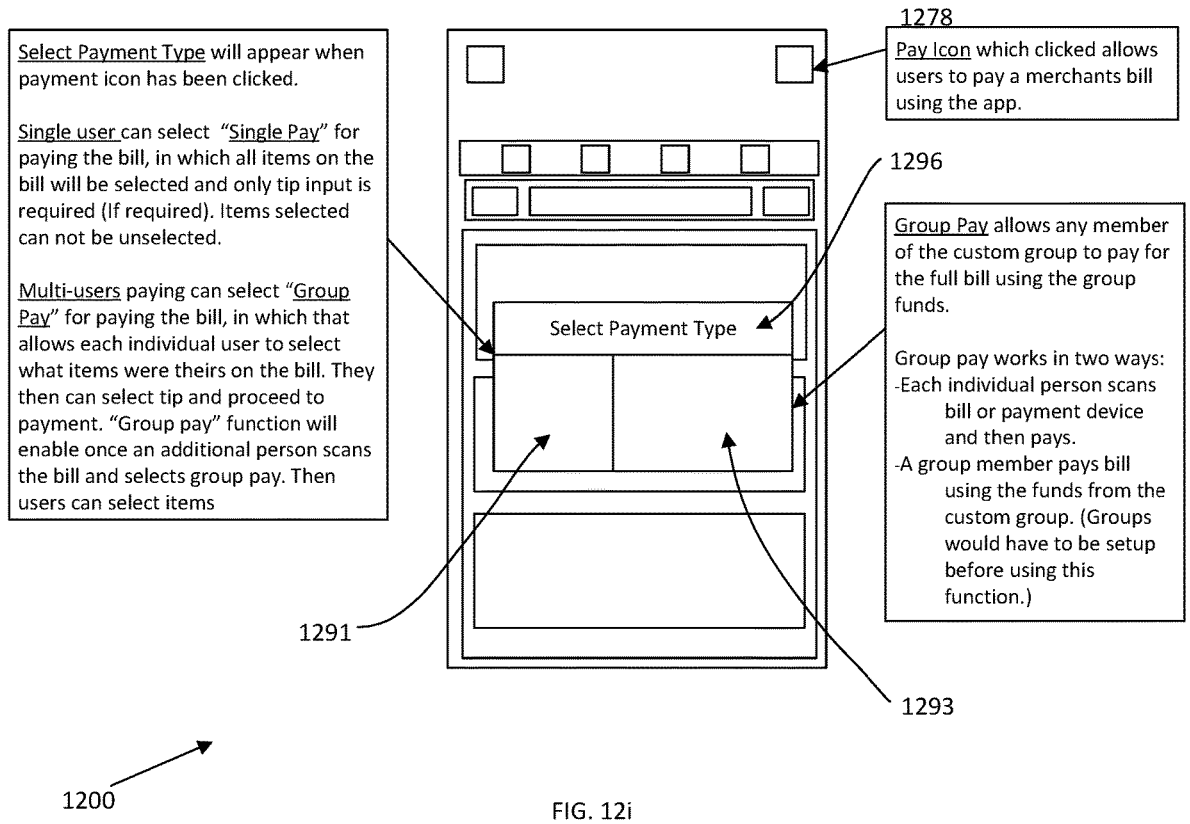
FIG. 12*i* is an exemplary screenshot of a graphical representation of a select payment type prompt that appears when a user has selected the pay icon in the second embodiment of the group transaction application.
Figure 12J:
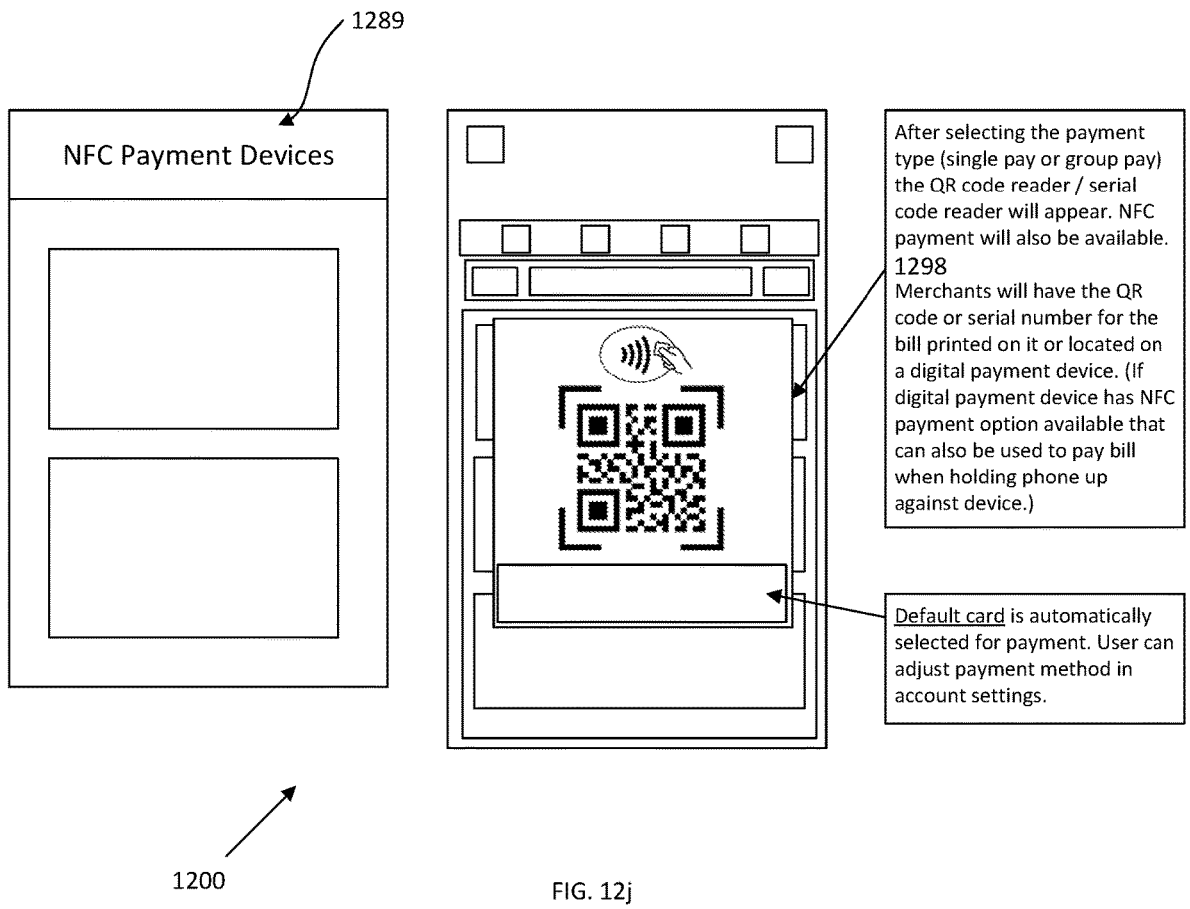
FIG. 12*j* is an exemplary screenshot of a graphical representation of a QR code reader/serial code reader screen in the second embodiment of the group transaction application.

Referring now to FIG. 12*i*, there is pictured a select payment type prompt 1296 that appears when a user has selected the pay icon 1278. For example, the pay icon 1278 when clicked allows users to pay a merchant's bill using the group transaction application. The select payment type prompt 1296 has a "single pay" option 1291 and a "group pay" option 1293. A single user can select "single pay" 1291 in which all the items on the bill are selected for payment and only a tip is needed from the user (if required). Items that are selected cannot be unselected.

Multi-users paying may select "group pay" 1293 for paying the bill, in which each individual group user may select items on bill to be held financially responsible for paying. The group user may then select a tip and proceed to payment. The "group pay" 1293 function is enabled once an additional person scans the bill and selects "group pay" 1293. Each individual group user selects items from the bill to purchase.

"Group pay" 1293 also allows any group user to pay for the entire bill using the group funds. "Group pay" 1293 works in two ways. First, each individual group user scans the bill or payment device and pays. Second, a group user pays the bill using group funds. However, in this instance, groups have to already exist to use this function. The "group pay" function 1293 can be used for, but not limited to, making payments/purchases on online orders, online bills, in store bills, utility bills, cable bills, rent payments, subscriptions, and forms of entertainment Referring now to FIG. 12*j*, there is pictured a QR code reader/serial code reader screen 1298. The QR/serial code reader 1298 appears after the user selects the payment type 1291, 1293 (i.e., single pay or group pay). Additionally, near field communication (NFC) payment 1289 may also be available. Participating merchants will have the QR code or serial number for the bill printed on the bill or located on a digital payment device. If the digital payment device has NFC payment option available, it can be used to pay the bill when holding the user device against the NFC merchant device 1289. When conducting a transaction, a default card is automatically selected for payment from the user's account. The user can adjust the payment method in account settings, accessible through the menu tab.

Figure 12K:
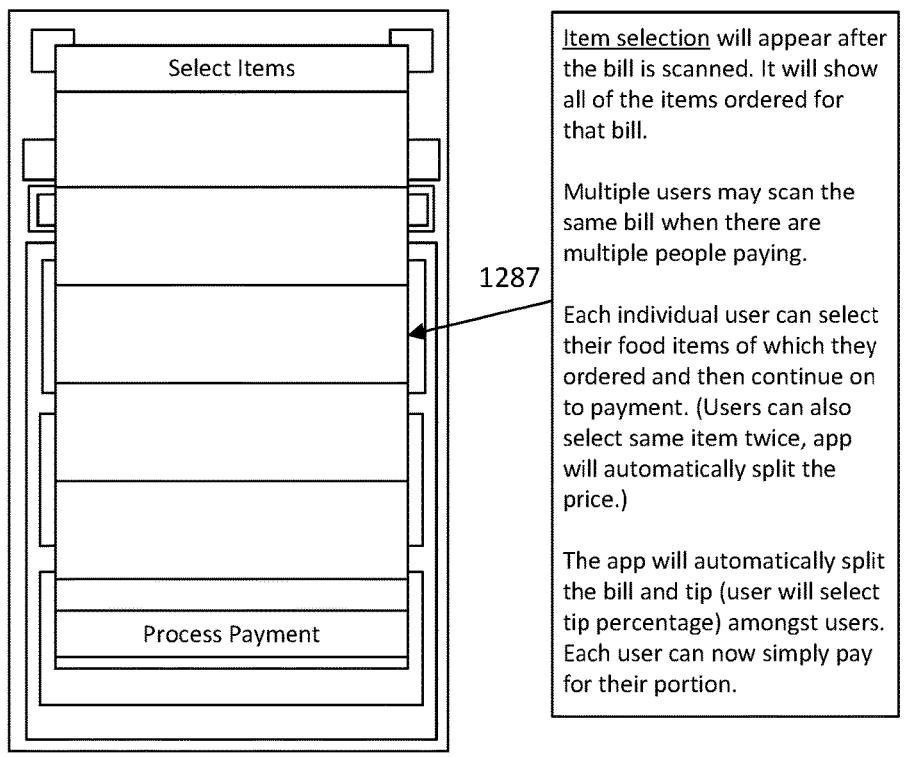
FIG. 12*k* is an exemplary screenshot of a graphical representation of an item selection list according to the second embodiment of the group transaction application.
Figure 12I:
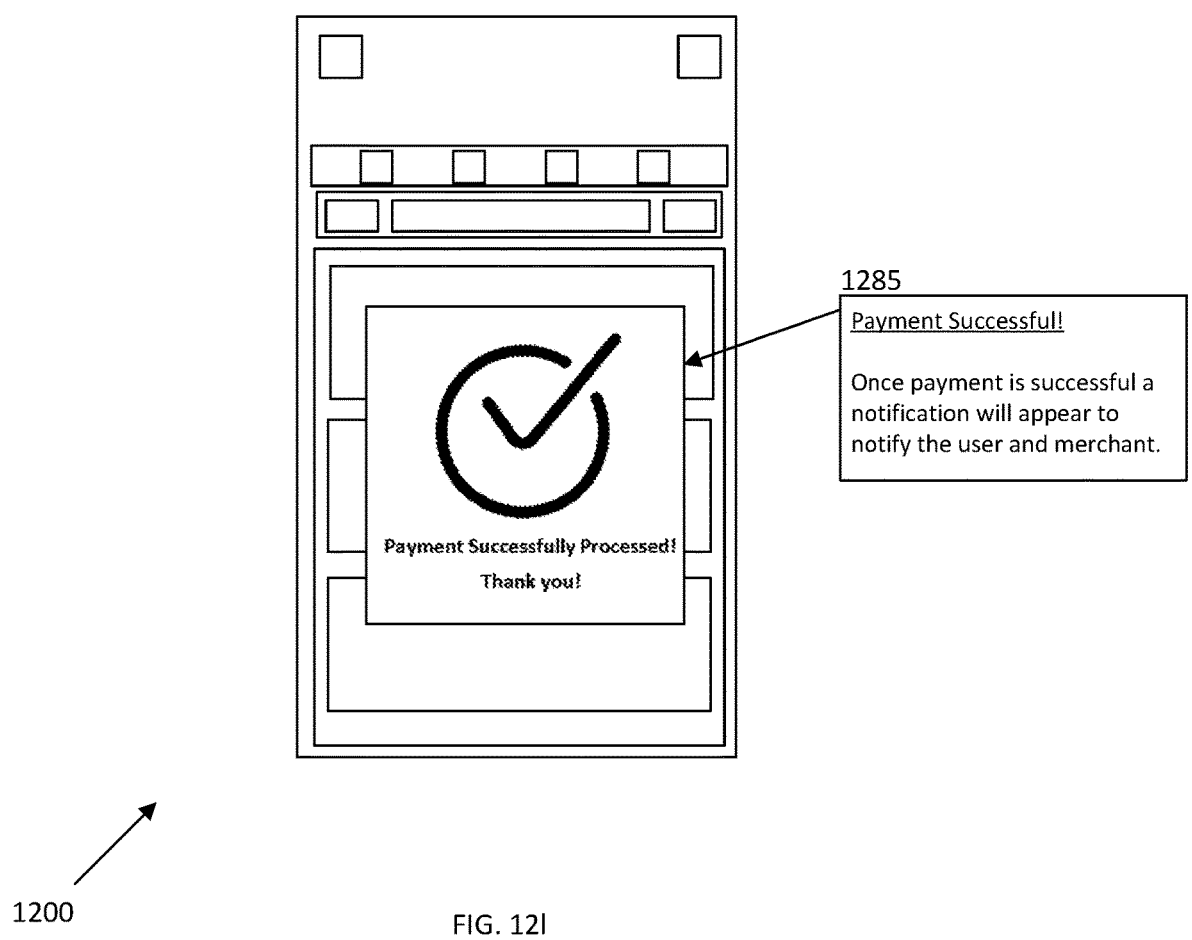

Referring now to FIG. 12*k*, there is a picture of a screen showing an example item selection 1287. After the bill is scanned, an item selection screen 1287 appears showing all of the items included in the transaction. Multiple group users may scan the same bill when there are multiple group users paying. As an example, each individual group user may select the food items they ordered and continue to payment. If multiple group users select the same item, the group transaction application automatically divides the price of the item evenly between the group users so that each group user now simply pays for their portion.

Referring now to FIG. 12*l*, there is pictured a screen showing a payment successfully processed 1285. Once payment is successfully processed, a notification will appear to notify the user and the merchant.

Figure 13:
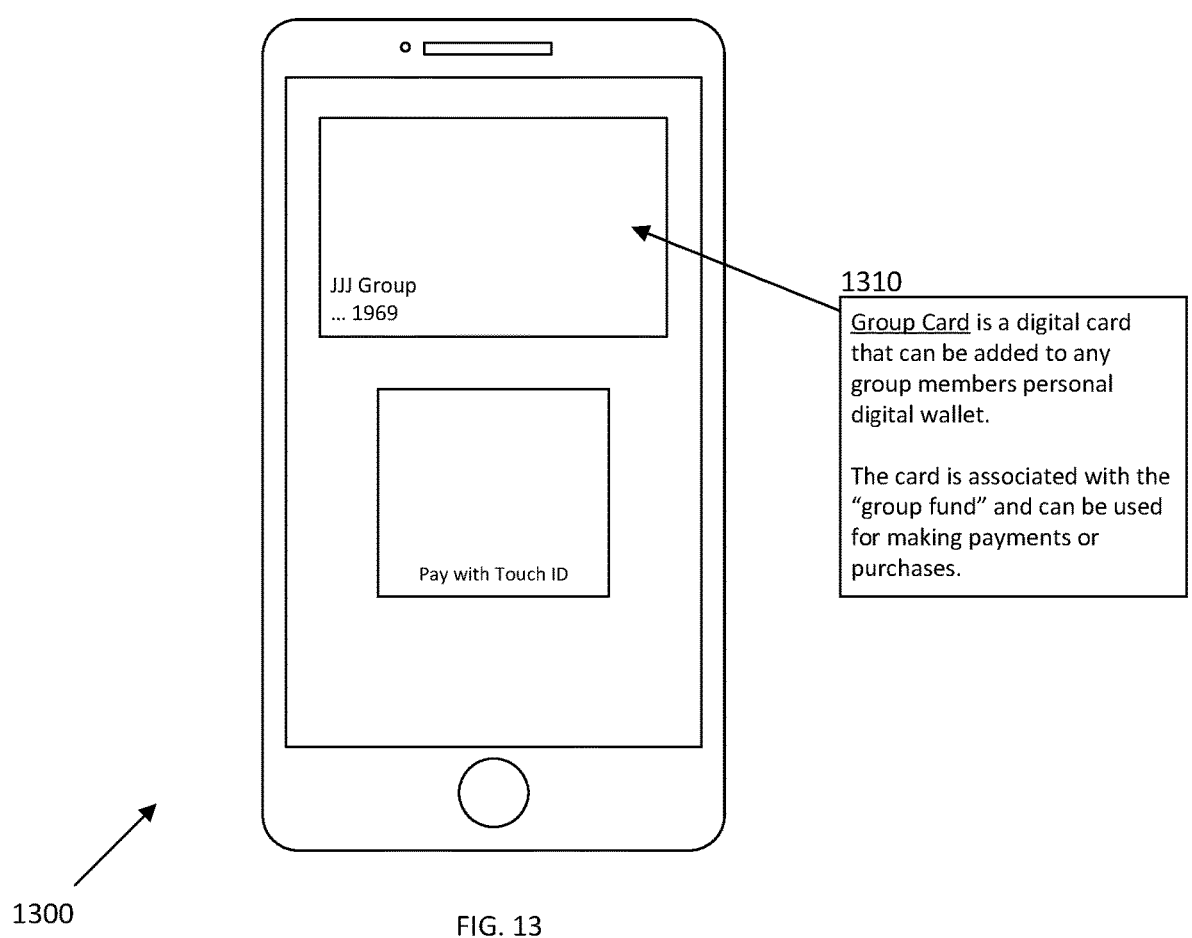
FIG. 13 is an exemplary screenshot of a graphical representation of a group card.

Referring now to FIG. 13, there is illustrated a group card 1310 featured by the group transaction application. The group card 1310 is a digital card that can be added to any group user's digital wallet. The card is associated with the "group fund" and can be used for making payments or purchases.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A method of performing a group transaction, the method comprising:
   forming a group using a group transaction application, wherein the group comprises a plurality of group users, each of the plurality of group users having an associated electronic device configured to access the group transaction application;
   each of the plurality of group users contributing, via the group transaction application, an amount of electronic currency to a group fund associated with the group, wherein the group fund is configured to store the electronic currency, the group fund having a balance based on the amount of electronic currency contributed from each of the plurality of group users;
   creating a digital card associated with the group fund, wherein the digital card is transferred to and accessible via a digital wallet of at least one electronic device of at least one of the group users, the digital card is configured to facilitate a payment to a payee from the balance of the group fund; and
   one of the plurality of group users initiating, via the group transaction application, a process to obtain authorization for the payment, the process comprising:
      transmitting a respective group fund request, via the group transaction application, to each of the associated electronic devices of the plurality of group users, wherein each of the respective group fund requests seek authorization from each of the plurality of group users to use at least a portion of the electronic currency of the group fund to make the payment; and
      receiving authorization from each of the plurality of group users to use at least a portion of the electronic currency of the group fund to make the payment, and completing the payment using the digital card, wherein the digital card facilitates a transfer of at least a portion of the balance of the electronic currency from the group fund to a separate fund of the payee.

2. The method of claim 1, further comprising:
   transmitting a second respective group fund request, via the group transaction application, to each of the associated electronic devices of the plurality of group users, wherein each of the respective second group fund requests seeks a second authorization from each of the plurality of group users to use at least a portion of the electronic currency of the group fund to make a second payment; and
   receiving the second authorization from each of the plurality of group users to use the group fund to make the second payment, and completing the second payment using the digital card, wherein the digital card facilitates a transfer of at least a portion of the electronic currency from the group fund to a separate fund of the payee.

3. The method of claim 1, wherein the payment is made to another group fund.

4. The method of claim 1, wherein the payment is made to a merchant.

5. The method of claim 1, wherein each of the respective group fund requests comprise a description and an estimated cost of the group transaction.

6. The method of claim 1, wherein the plurality of group users includes a group leader, the group leader responsible for forming the group and transmitting the group fund request.

7. The method of claim 1, wherein contributing an amount of electronic currency to the group fund comprises each of the plurality of group users contributing an individual portion of electronic currency to the group fund.

8. The method of claim 7, further comprising withdrawing electronic currency from the group fund, wherein each of the plurality of group users are authorized to withdraw only the individual portion of electronic currency contributed by the respective group user.

9. The method of claim 1, wherein the group transaction application is configured for point of sale transactions or for automatic clearing house transactions.

10. The method of claim 1, wherein the group transaction application is configured to facilitate the group transaction, via the digital card, using near field communication.

11. The method of claim 1, wherein the group transaction application comprises a social media feature, the social media feature configured to facilitate comments or reviews associated with the group transaction.

12. A non-transitory, computer-readable storage medium comprising computer-executable instructions, that, when executed by at least one processor, perform a method comprising:

forming a group, wherein the group comprises a plurality of group users, each of the plurality of group users having an associated electronic device;

each of the plurality of group users contributing, via a group transaction application, an amount of electronic currency to a group fund associated with the group, wherein the group fund is configured to store the electronic currency, the group fund having a balance based on the amount of electronic currency contributed from each of the plurality of group users;

creating a digital card associated with the group fund, wherein the digital card is transferred to and is accessible via a digital wallet of at least one electronic device of at least one of the group users, the digital card is configured to facilitate a payment to a payee from the balance of the group fund;

one of the plurality of group users initiating, via the group transaction application, a process to obtain authorization for the payment, the process comprising;

transmitting a respective group fund request to each of the associated electronic devices of the plurality of group users, wherein each of the respective group fund requests seek authorization from each of the plurality of group users to use at least a portion of the electronic currency of the group fund to make the payment; and receiving authorization from each of the plurality of group users to use at least a portion of the electronic currency of the group fund to make the payment, and completing the payment using the digital card, wherein the digital card facilitates a transfer of at least a portion of the balance of the electronic currency from the group fund to a separate fund of the payee.

\* \* \* \* \*